United States Patent
Nakatsuka

(10) Patent No.: US 8,225,200 B2
(45) Date of Patent: Jul. 17, 2012

(54) EXTRACTING A CHARACTER STRING FROM A DOCUMENT AND PARTITIONING THE CHARACTER STRING INTO WORDS BY INSERTING SPACE CHARACTERS WHERE APPROPRIATE

(75) Inventor: Tadanori Nakatsuka, Kawasaki (JP)

(73) Assignee: Canon Kabushiki Kaisha, Toyko (JP)

( * ) Notice: Subject to any disclaimer, the term of this patent is extended or adjusted under 35 U.S.C. 154(b) by 1196 days.

(21) Appl. No.: 11/952,895

(22) Filed: Dec. 7, 2007

(65) Prior Publication Data

US 2008/0144062 A1 Jun. 19, 2008

(30) Foreign Application Priority Data

Dec. 13, 2006 (JP) .................................. 2006-336371

(51) Int. Cl.
*G06F 17/00* (2006.01)
(52) U.S. Cl. .......................... 715/245; 715/234; 715/256
(58) Field of Classification Search .................... 715/245
See application file for complete search history.

(56) References Cited

U.S. PATENT DOCUMENTS

| 5,832,530 A * | 11/1998 | Paknad et al. ................. 715/235 |
| 2007/0002054 A1* | 1/2007 | Bronstein ..................... 345/467 |
| 2007/0055933 A1* | 3/2007 | Dejean et al. ................ 715/533 |

FOREIGN PATENT DOCUMENTS

JP 05-067237 A 3/1993

\* cited by examiner

*Primary Examiner* — Stephen Hong
*Assistant Examiner* — Asher Kells
(74) *Attorney, Agent, or Firm* — Canon USA Inc. IP Division

(57) ABSTRACT

An apparatus includes a character extraction unit configured to extract a character string from a document including layout information, a character width acquisition unit configured to acquire space character width information, and a spacing amount determination unit configured to determine a spacing amount of each inter-character space based on the character string extracted by the character extraction unit and the layout information. The apparatus further includes an insertion unit configured to determine whether a space character is to be included in each inter-character space based on the spacing amount of each inter-character space determined by the spacing amount determination unit and the space character width information acquired by the character width acquisition unit, and to insert a space character code into an inter-character space in which a space character is determined to be included.

12 Claims, 20 Drawing Sheets

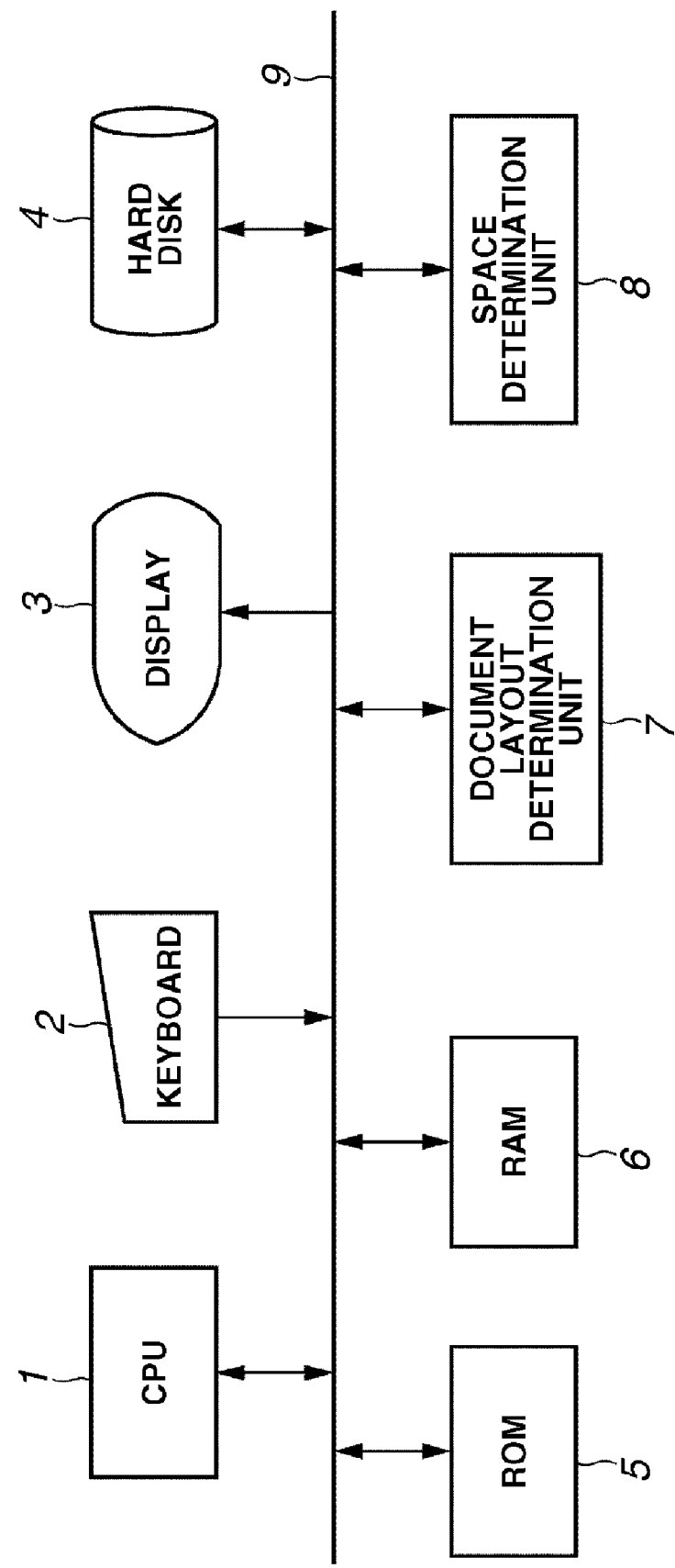

FIG.4B

(4-2) SET NEXT CHARACTER BLOCK AS TARGET CHARACTER BLOCK AND COMPARE POSITION OF NEXT CHARACTER BLOCK WITH POSITION OF STARTING CHARACTER BLOCK;
→ DETERMINE THAT BLOCKS BELONG TO THE SAME LINE WITH NO OFFSET IN VERTICAL DIRECTION (VERTICAL OFFSET: 0 -2 TD, T*, ETC.)

(4-3) DETERMINE THAT NEXT CHARACTER BLOCK BELONGS TO THE SAME LINE SIMILAR TO (4-2)

(4-5) DETERMINE THAT CHARACTER BLOCKS OF (4-1) TO (4-3) BELONG TO THE SAME LINE; STORE RIGHTMOST AND LEFTMOST POSITIONS OF LINE; DETERMINE AND STORE DISTRIBUTION OF CHARACTER SPACING AMOUNT (4-7) DETERMINE THAT BLOCKS BELONG TO THE SAME PARAGRAPH; RIGHTMOST POSITIONS ARE ALMOST ALIGNED; LEFTMOST POSITIONS ARE ALMOST ALIGNED; THERE ARE TWO TYPES OF CHARACTER SPACING AMOUNT IN RESPECTIVE LINES; DETERMINE THAT EACH LINE IS EQUAL SPACED (4-6) DETERMINE NEXT LINE SIMILARLY AND STORE RIGHTMOST AND LEFTMOST POSITIONS AND CHARACTER SPACING AMOUNT (4-1) STARTING CHARACTER BLOCK (4-4) DETERMINE THAT BLOCKS DO NOT BELONG TO THE SAME LINE BECAUSE OF VERTICAL OFFSET

This is a pen.

EXTRACTING A CHARACTER STRING FROM A DOCUMENT AND PARTITIONING THE CHARACTER STRING INTO WORDS BY INSERTING SPACE CHARACTERS WHERE APPROPRIATE

BACKGROUND OF THE INVENTION

1. Field of the Invention

The present invention relates to a document processing method and a document processing apparatus, and more particularly to a document processing method and a document processing apparatus for extracting a character string from a document including document layout information.

2. Description of the Related Art

Conventional methods may be used to search a document for a character string by extracting a character string included in the document and determining whether the character string includes a search key. For example, in a general searching method, it is determined whether at least apart of the extracted character string includes a search key (hereinafter referred to as a "normal search"). Specific search examples include an "exact word-match search" for searching for a full-matched word and a "phrase search" for searching for a phrase including a plurality of words including a space or spaces.

For example, if an input search key is "the", and a character string of "This theory was confirmed." is extracted from a document, the normal search can find "the" in the "theory" as a hit. However, the exact word-match search cannot find "the" in the "theory" as a hit. On the other hand, if the search key is "theory", the exact word-match search can find "theory" as a hit because of extracting a word using a space.

Similarly, if an input search key is "thistheory", and a character string of "This theory was confirmed." is extracted from a document, the phrase search cannot find any phrase as a hit. However, when a space is inserted into the search key, that is, "this theory" is input, the phrase search can find a search hit.

Accordingly, the extracted character string should include a space in a correct position when the exact word-match search or the phrase search is conducted.

On the other hand, a space character may be represented by changing a character position in a document in which a layout of characters is held. For example, such representation may be used in Portable Document Format (PDF) or Page Description Language (PDL). For example, printer driver type software may be used as software for generating a PDF file. This software selects a PDF generating driver in place of a general printer driver upon sending a command to print in a word processor application or drawing application that generates an original document to thereby generate a PDF file in response to the print command. At this time, the application that has generated the original document determines which print command is sent from the application to the PDF generating driver to print a document including a character string including a space character. That is, if the application is set so as to omit outputting a space character code upon printing, a PDF file generated by the PDF generating driver does not include the space character code and thus represents a space using a character position. If characters are extracted from such a PDF document or PDL document, a character code of a space character is not included in the characters, resulting in a problem that neither the exact word-match search nor the phrase search can correctly find a word or phrase.

For example, if an original document includes a character string of "this is a pen", the document is converted into a PDF document, and the converted PDF document is described as "[(This)-833.4(is)-833.4(a)-833.4(pen.)]TJ" based on the description for representing a space by changing a character position, "thisisapen." is extracted from the PDF document based on the character code. In this case, if an input search key is "a pen", since characters extracted from the document include no space character code, the phrase search cannot find any phrase as a hit. Also, the exact word-match search cannot find any word.

Further, the document may be converted into such a description that finely specifies each character position. For example, when a character string equal-spaced or justified in the original document is converted, each character position may be specified. For example, the character string may be converted into a description such as "[(T)-833.4(h)-833.4(i)-833.4(s)-848.4(i)-833.4(s)-848.4(a)-848.5(p)-833.4(e)-833.4(n.)]TJ". In this case, if only character code is extracted from the PDF document, "thisisapen." is extracted, so that neither the phrase search nor the exact word-match search can find any word or phrase as a hit.

Meanwhile, there is a technique of inserting a space into a result of recognizing characters in an image captured by scanning a paper document. For example, a technique as discussed in Japanese Patent Application Laid-Open No. 5-67237 clips a character region in an image and determines space character width candidates based on a character width distribution. Then, the technique sets an inter-character space as a space to determine a word length in each candidate, and selects a space character width having a word length distribution close to a predetermined word length distribution to thereby insert a space according to the space character width.

However, the technique as discussed in Japanese Patent Application Laid-Open No. 5-67237 aims at processing a scanned image, not at processing a document described in character code. Further, the technique as discussed in Japanese Patent Application Laid-Open No. 5-67237 may not obtain a correct space character width, so that a space determination accuracy is lowered. In addition, a character image may be erroneously recognized upon character recognition to provide wrong character code as a recognition result. This causes a problem that the exact word-match search and the phrase search may rarely find a word or phrase as a hit.

SUMMARY OF THE INVENTION

An embodiment of the present invention is directed to a method and an apparatus capable of determining a space character width and analyzing a document structure or layout, such as equal space and heading, to determine whether a space character is included between each character.

According to an aspect of the present invention, an apparatus includes a character extraction unit configured to extract a character string from a document including layout information, a character width acquisition unit configured to acquire space character width information, a spacing amount determination unit configured to determine a spacing amount of each inter-character space based on the character string extracted by the character extraction unit and the layout information, and an insertion unit configured to determine whether a space character is to be included in each inter-character space based on the spacing amount of each inter-character space determined by the spacing amount determination unit and the space character width information acquired by the character width acquisition unit, and to insert a space character code into an inter-character space in which a space character code is determined to be included.

According to an exemplary embodiment of the present invention, a space character width is acquired based on a font in a document or system, or a font stored in a device, to enable accurately detecting the space character width. Further, determination conditions can be changed according to a result of analyzing a document structure, such as a Japanese/alphabetical document, equal space, heading, and layout, to enable accurately determining whether to insert a space character. Accordingly, a character string that cannot be found by a character search, such as a phrase search or an exact word-match search, can be changed to a character string that can be found by the character search.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1A is a block diagram of an example of a configuration of a document processing apparatus according to an exemplary embodiment of the present invention.

FIGS. 4A and 4B illustrate an example of the determination as to equal space illustrated in FIG. 3 according to an exemplary embodiment of the present invention.

DETAILED DESCRIPTION OF THE EMBODIMENTS

Figure 1B:
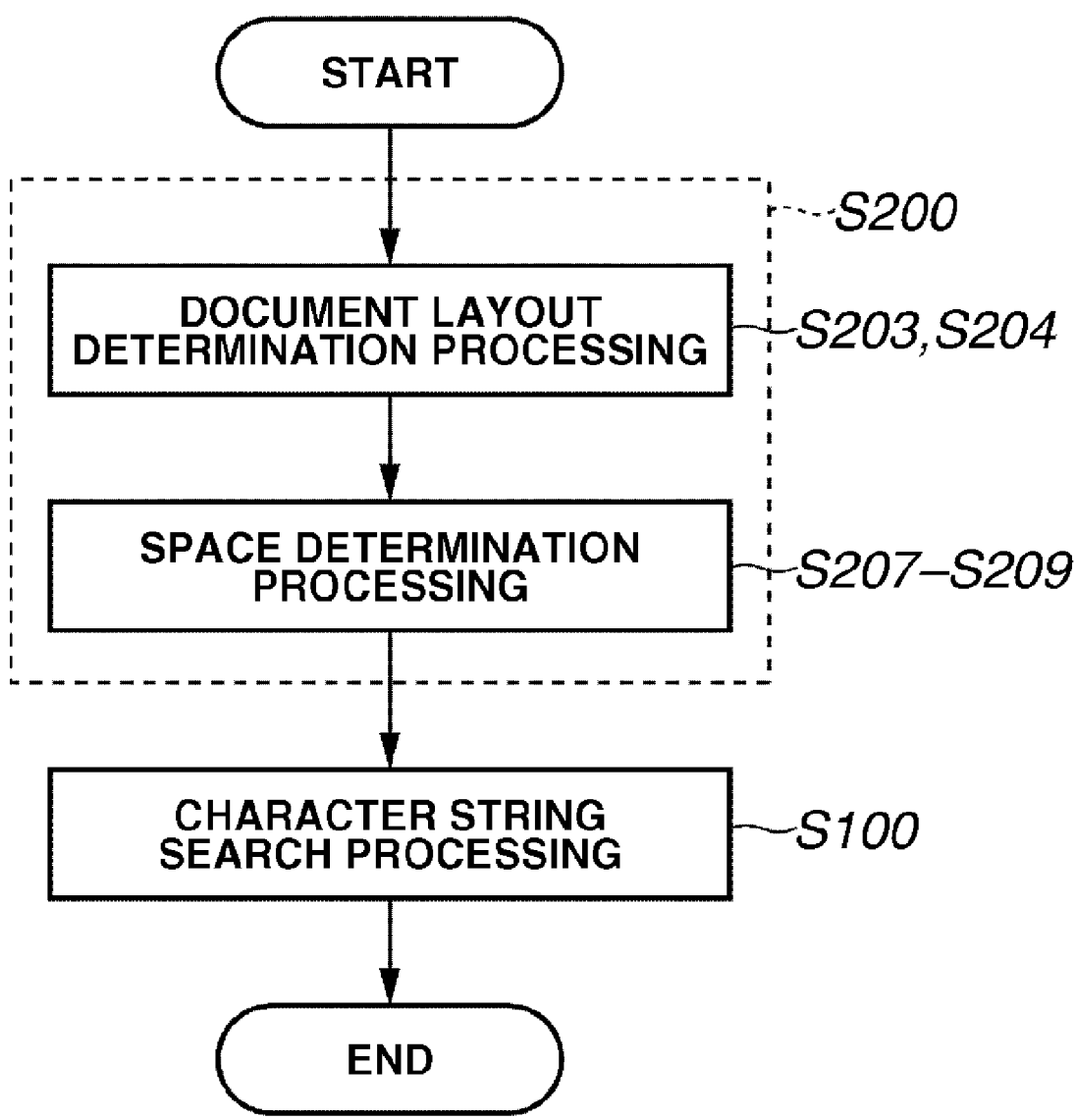
FIG. 1B is a flowchart of an example of an operation of the document processing apparatus according to an exemplary embodiment of the present invention.

Various exemplary embodiments, features, and aspects of the invention will be described in detail below with reference to the drawings.

FIG. 1A is a block diagram of an example of a configuration of a document processing apparatus according to an exemplary embodiment of the present invention.

The document processing apparatus includes an arithmetic-control central processing unit (CPU) 1, a keyboard 2 for inputting data and instructions, a display 3 for displaying a document image, a hard disk 4 for storing a document, a read-only memory (ROM) 5 storing programs for controlling the apparatus or necessary information, a random access memory (RAM) 6 used as various work areas, a document layout determination unit 7 corresponding to an analysis unit for analyzing a document structure and configured to determine a document layout for determination as to space/tab, a space determination unit 8 for determining a space/tab upon extracting characters from a document and inserting a space/tab, and a data bus 9 for transferring various types of data.

While the document layout determination unit 7 and the space determination unit 8 are shown in FIG. 1A as being separate from the CPU 1, it is noted that some or all of the functions of the document layout determination unit 7 and the space determination unit 8 as described herein may be performed by the CPU 1. More specifically, in an embodiment, the CPU 1 executes a computer program stored in the ROM 5 to implement the document layout determination unit 7 and the space determination unit 8. That is, the computer program causes the CPU 1 to function as the document layout determination unit 7 and the space determination unit 8. Here, a computer-readable storage medium storing the computer program is not limited to the ROM 5. For example, the hard disk 4 can be used.

FIG. 1B is a flowchart of processing according to an exemplary embodiment of the present invention including a processing operation of the document layout determination unit 7 and the space determination unit 8.

Figure 2:
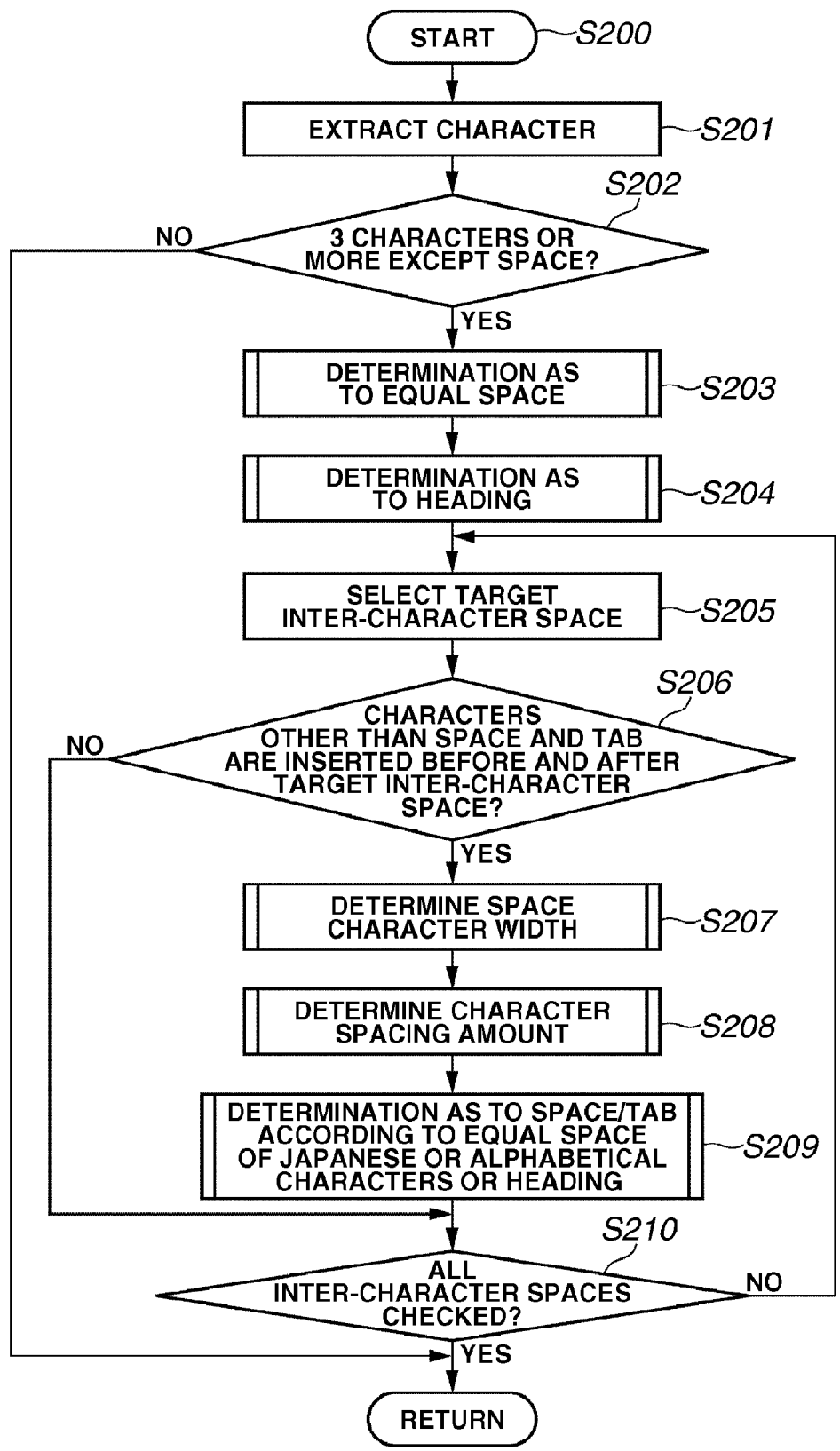
FIG. 2 is a flowchart of an example of a procedure of document processing according to an exemplary embodiment of the present invention.

In step S200, the following document processing as illustrated in FIG. 2 is performed. Step S200 includes steps S203 and S204 for document layout processing corresponding to the processing operation of the document layout determination unit 7 and space determination steps S207 to S209 corresponding to the processing operation of the space determination unit 8. Steps S203, S204, and S207 to S209 correspond to similar steps illustrated in FIG. 2 (as described in detail below with reference to FIG. 2 and subsequent figures).

In step S100, character string search processing including, for example, an exact word-match search or a phrase search, is performed on a document subjected to adjustment (insertion processing) of a space or tab in step S200.

Figure 1C:
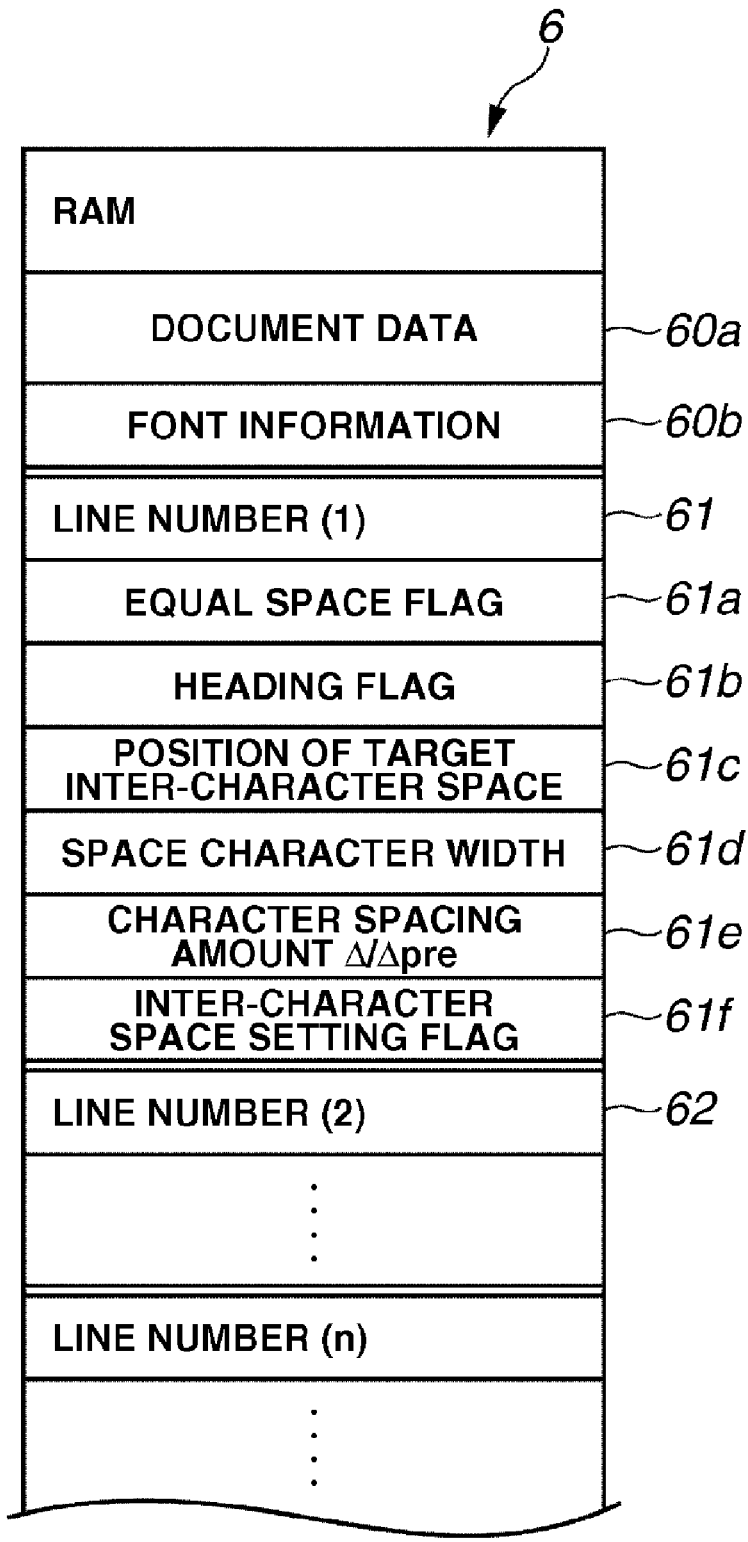
FIG. 1C illustrates an example of a configuration of a storage area of a random access memory (RAM) illustrated in FIG. 1A according to an exemplary embodiment of the present invention.

FIG. 1C illustrates an example of a configuration of a storage area of the RAM 6 for executing the document processing according to an exemplary embodiment of the present invention. In FIG. 1C, data irrelevant to the document processing of the present exemplary embodiment or variables for use in processing of each step illustrated in FIG. 2 are omitted.

In FIG. 1C, document data 60a is a target for document processing of the present exemplary embodiment, for example, a document in PDF "TJ" operator form. Font information 60b indicates a font used in the document data 60a. Further, the font information 60b includes a code page of the font (i.e., country information). The font itself can be stored in the ROM 5, the hard disk 4, or a compact disc (CD) or memory chip (not illustrated).

Extracted lines are numbered 61, 62, . . . . An area for storing the following data or flag is secured for each of the lines 61, 62, . . . . The following description is focused on the line 61 by way of example. The same applies to subsequent lines.

A flag 61a indicates a result of determination as to equal space in step S203. A flag 61b indicates a result of determination as to heading in step S204. A pointer 61c indicates a target inter-character position as a processing target in steps S207 to S209. A storage area 61d stores a space character width extracted in step S207. A storage area 61e stores a character spacing amount Δ/Δpre extracted in step S208. A flag 61f indicates whether to insert a space according to the processing result in step S209.

A Program stored in the ROM 5 or the hard disk 4 is loaded to the RAM 6 by use of the areas of the RAM 6, and the CPU 1 executes processing illustrated in FIG. 2 and subsequent figures.

FIG. 2 is a flowchart of an example of a procedure of document processing step S200 in the document processing apparatus according to an exemplary embodiment of the present invention.

Document processing for generating an extraction result by performing a space determination on characters extracted from a document in horizontal writing to insert an adequate space, which is performed when extracting characters from a document, such as a PDF document, that contains document layout information, will be described below in detail. The same processing can be applied to a document in vertical writing.

First, in step S201, the CPU 1 first extracts all characters in the document.

For example, in order to represent "This is a pen." in a PDF document, this string is represented as "(This is a pen.) Tj". Accordingly, the CPU 1 can extract characters in the document by extracting characters of the Tj operator in order. In this example, the document includes a space character code. As a result of extracting characters, normal characters and space characters are extracted, so that "This is a pen." is obtained.

Next, an example of a case where a document does not include a space character code, to which the present exemplary embodiment is directed, will be described.

Another representation method using a "TJ" operator in PDF can specify spaces between individual characters (character spacing).

If written in the TJ operator using a character spacing amount, rather than space characters, "This is a pen." is represented as [(This)-833.4(is)-833.4(a)-833.5(pen.)]TJ, in which the character spacing amount indicating the next character position is written. In this example, the character spacing amount is used in place of the space characters but can be specified according to a character layout regardless of whether space characters are included. In this way, if the character spacing amount is written in place of the space characters, no space character code is written. Thus, if the CPU 1 extracts a character code, "Thisisapen." is obtained, which includes no space character. That is, there is a problem that neither the exact word-match search nor the phrase search can find any word or phrase as a hit.

Which of the Tj operator and the TJ operator is used is determined according to an output of software for generating a PDF file or software that has generated the original document. Further, even in the case of using the TJ operator, a document may include space characters in some software components. For example, printer driver type software may be used as software for generating a PDF file. If a PDF generating driver is selected in place of a general printer driver upon sending a command to print out in a word processor application or drawing application that generates the original document, the software generates a PDF file in response to the print command. At this time, the application that has generated the original document determines which print command is sent from the application to the PDF generating driver to print a document including a character string including a space character. Thus, the documented PDF file may include or may not include space characters.

As described above, in step S201, the CPU 1 extracts all characters in "Tj" or "TJ" operator from the document.

In step S202 and subsequent steps, the CPU 1 executes space/tab determination and insertion processing. That is, the CPU 1 determines whether to insert a space character or a tab into characters extracted in step S201, and if determining to insert a space character or a tab, automatically inserts a space character code or a tab code.

In step S202, the CPU 1 determines whether the character string extracted from the document in step S201 includes three or more characters except space characters. If three or more characters are detected (YES in step S202), the processing advances to step S203. If three or more characters are not detected (NO in step S202), the CPU 1 skips the space determination processing, and outputs the characters extracted in step S201 and then terminates the processing. This is because the number of characters is insufficient for space/tab determination. In this example, the character string extracted from the Tj operator can be output on the assumption that space characters are inserted. Further, if the TJ operator includes no space character code, the processing advances to step S203. If the character string extracted from the TJ operator includes any space character code, the extracted character string can be output as it is on the assumption that space characters are inserted.

In step S203, the CPU 1 executes determination as to equal space on each line in the document (as described in detail below with reference to FIG. 3 and FIGS. 4A and 4B). Next, the CPU 1 executes determination as to heading in step S204 (as described in detail below with reference to FIGS. 5 and 6).

In steps S205 to S209, the CPU 1 determines whether to insert a space/tab. In step S205, the CPU 1 selects a target inter-character space. The CPU 1 first performs determination as to an inter-character space between the first character and the next character. If the processing has returned to step S205 from step S210, the CPU 1 performs determination as to the next inter-character space. Thus, the CPU 1 sequentially determines whether to insert a space/tab into each inter-character space.

In step S206, the CPU 1 determines whether characters other than a space/tab are inserted before and after a target inter-character space. If a space character code or a tab code is inserted before or after the target inter-character space (NO in step S206), the CPU 1 advances to step S210 without space/tab determination as to whether to insert a space/tab to the target inter-character space. If both of character codes before and after the target inter-character space are not a space or tab (YES in step S206), the processing advances to step S207. In step S207, the CPU 1 acquires information about a character width of the space character code. That is, a character width determination unit acquires space character width information (as described in detail below with reference to FIG. 7).

In step S208, the CPU 1 acquires a character spacing amount Δ of a target inter-character space and a character spacing amount Δpre of a previous inter-character space (as described in detail below with reference to FIGS. 8 and 9).

In step S209, the CPU 1 performs determination of equal space of Japanese text/English text (alphabetical text) and determination of a heading, and then performs space/tab determination. If it is determined to insert a space character, the CPU 1 inserts a required space character code or tab code (as described in detail below with reference to FIG. 10 and subsequent figures).

In step S210, the CPU 1 determines whether all inter-character spaces have been checked. If any space remains to be checked (NO in step S210), the CPU 1 returns to step S205 and then repeats space/tab determination on the next inter-character space as described above. If all of the inter-character spaces have been checked (YES in step S210), the CPU 1 outputs the result of extracting characters together with the space/tab determination result to complete the document processing of the present exemplary embodiment.

Accordingly, a space or tab is correctly inserted into a document through the processing illustrated in FIG. 2, so that an accuracy of search processing in step S100 can be improved. As is apparent from the above description, problems with processing for searching for a character string in a document having a space character or tab described with a character position, rather than a character code, in particular, in an exact word-match search and a phrase search, can be solved. A detailed description about the search processing in step S100 is omitted here.

Each processing is described in detail below according to steps of a detailed procedure of the flowchart illustrated in FIG. 2.

Figure 3:
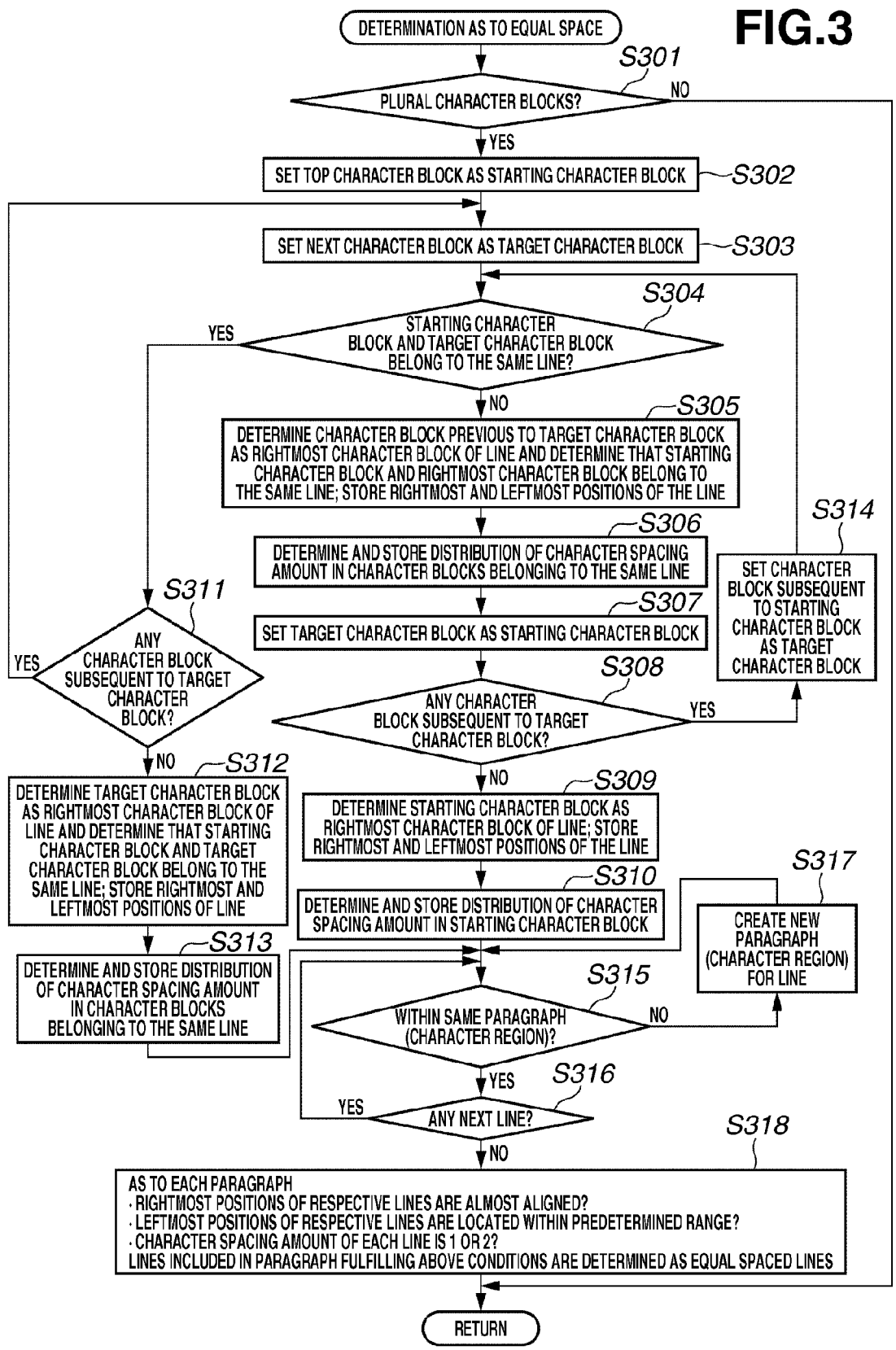
FIG. 3 is a flowchart of an example of a procedure of determination as to equal space illustrated in FIG. 2 according to an exemplary embodiment of the present invention.

FIG. 3 is a flowchart of a detailed procedure for determination as to equal space on each line in a document in step S203. A description is given based on determination as to equal space in FIGS. 4A and 4B. FIG. 4A illustrates an example of an English document, and FIG. 4B illustrates an example of a Japanese document.

In step S301, the CPU 1 determines whether the document includes plural character blocks. Here, the term character block means a group of characters in the document. That is, each character string described in "Tj" or "TJ" operator is determined as a character block.

For example, if "(This is a pen.) Tj" is described in a PDF document, "This is a pen." is determined as one character block. Further, if a character string is described as "[(This)-833.4(is)-833.4(a)-833.5(pen.)]TJ", "Thisisapen" is determined as one character block as well. In addition, if a character string is described as "[(This)-833.4(is)]TJ 12Td [(a)-833.5(pen.)]TJ", two character blocks, "Thisis" and "apen", are obtained.

If the document does not include plural character blocks (NO in step S301), the CPU 1 does not need to perform determination as to equal space and thus terminates equal space processing. If the document includes plural blocks (YES in step S301), the processing advances to step S302.

In step S302, the CPU 1 sets the top character block as a starting character block. Here, a block (4-1) in FIGS. 4A and 4B is specified as a starting character block by the CPU 1. In step S303, the CPU 1 sets the next character block as a target character block. In the examples illustrated in FIGS. 4A and 4B, a character block (4-2) is set as a target character block.

In step S304, the CPU 1 compares the starting character block and the target character block to determine whether the two blocks belong to the same line. A determination unit determines that the two blocks do not belong to the same line if T* indicating a line break or a TD operator involving a vertical offset exists between one character block and the next character block. On the other hand, if these operators are not found, the CPU 1 determines that the two blocks belong to the same line. If the two blocks belong to the same line (YES in step S304), the processing advances to step S311. If the two blocks do not belong to the same line (NO in step S304), the processing advances to step S305. In the example illustrated in FIG. 4A, "Book" and "Bus" are on the same line. In the example illustrated in FIG. 4B, "あき"and "あり"are on the same line.

The following description is focused on the case where the starting character block and the target character block belong to the same line. In step S311, the CPU 1 determines whether another character block follows the target character block. If another character block follows the target character block (YES in step S311), the processing advances to step S303 to determine whether the two blocks belong to the same line. If no character block follows the target character block (NO in step S311), the processing advances to step S312.

Figure 4A:
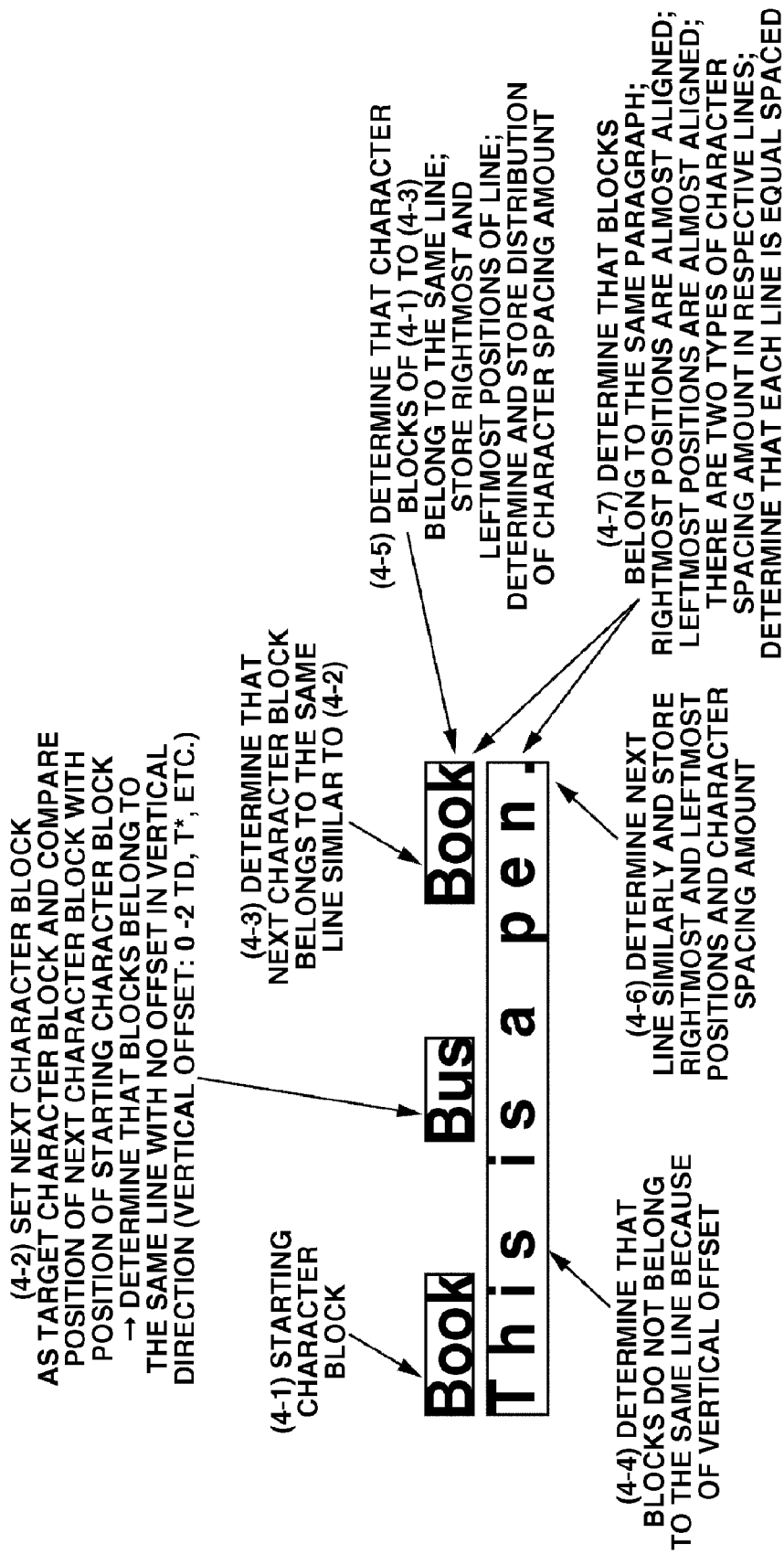

In the example illustrated in FIG. 4A, a character block "Block" (4-3) follows, so that the processing advances to step S303. Then, the CPU 1 sets "Block" (4-3) as a target character block and advances to step S304. In step S304, the CPU 1 determines that "Block" (4-3) and the starting character block "Book" are on the same line, and advances to step S311. In step S311, the CPU 1 sets a subsequent character block "This is a pen." (4-4) as a target character block and advances to step S303.

If the character block (4-4) does not follow the character block (4-3) in the example illustrated in FIG. 4A, the CPU 1 determines that no character block follows in step S311 (NO in step S311) and advances to step S312. In step S312, the CPU 1 determines the target character block (4-3) as the rightmost character block of the line and stores characters from the starting character block (4-1) to the target character block (4-3) as characters belonging to the same line. The CPU 1 stores the rightmost position of the target character block (4-3) as the rightmost position of the line. The CPU 1 stores the leftmost position of the starting character block as the leftmost position of the line. Then, the processing advances to step S313, in which the CPU 1 determines and stores a distribution of a character spacing amount (inter-character space amount) of a character block group including character blocks on the same line.

The CPU 1 calculates the character spacing amount of the inter-character space based on an amount specified by the TJ operator, a character spacing specified by the Tc operator, and a horizontal offset amount specified by the TD operator (or Td operator). If there is no operator that specifies a character spacing amount, such as "TJ" or "TD" operator, the character spacing amount is 0. If the character spacing amount is 0, characters are laid out according to a designated font. Next, the processing advances to step S315.

Referring back to step S304, a description is made of the case where the starting character block and the target character block are on different lines. In step S305, the CPU 1 determines a character block previous to the target character block as the rightmost character block of the line and stores character blocks from the starting character block to the character block previous to the target character block as characters on the same line. Further, the CPU 1 stores the rightmost position of the line based on the rightmost position of the previous character block. The CPU 1 stores the leftmost position of the starting character block as the leftmost position of the line. If the character block (4-4) illustrated in FIG. 4A is set as the target character block, the CPU 1 determines that the starting character block "Book" and the target character block "This is a pen." are on different lines (NO in step S304) and advances to step S305. Then, in step S305, the CPU 1 determines a previous character block (4-3) as the rightmost character block as indicated by (4-5) illustrated in FIG. 4A and determines character blocks from the starting block (4-1) to the rightmost character block (4-3) as character blocks on the same line ("Book", "Bus", "Block"). Further, the CPU 1 stores the rightmost position and leftmost position of the line, and a character spacing amount (4-5).

In step S306, the CPU 1 determines and stores a distribution of a character spacing amount of character blocks "Book", "Bus", and "Block", which are determined to belong to the same line.

In step S307, the CPU 1 sets a target character block, that is, a character block determined to belong to the next line, as a starting character block. In the example illustrated in FIG. 4A, the character block (4-4), "This is a pen.", is set as a starting character block.

In step S308, the CPU 1 determines whether any character block follows the starting character block. If any character block follows (YES in step S308), the processing advances to step S314, in which the CPU 1 continues to determine whether the two blocks belong to the same line.

On the other hand, if no character block follows (NO in step S308), the processing advances to step S309. In the example illustrated in FIG. 4A, no character block follows the character block (4-4), "This is a pen.", so that the processing advances to step S309.

If any character block follows (YES in step S308), then in step S314, the CPU 1 sets a character block subsequent to the starting character block as a target character block and returns to step S304. Then, the CPU 1 determines whether the two blocks belong to the same line as described above.

In step S308, if the CPU 1 determines that no character block follows the starting character block (NO in step S308), the processing advances to step S309, in which the CPU 1 determines the starting character block as the rightmost character block of the line. Further, the CPU 1 stores a rightmost position of the character block as a rightmost position of the line. The CPU 1 stores a leftmost position of the starting character block as a leftmost position of the line. Next, in step S310, the CPU 1 determines and stores a distribution of a character spacing amount of the starting character block. In the example illustrated in FIG. 4A, the CPU 1 stores a rightmost position and leftmost position and a character spacing amount of the line "This is a pen." as indicated by (4-6).

With the above processing, all character blocks are categorized on a line-by-line basis, and a rightmost position and leftmost position and a character spacing amount are stored for each line.

In steps S315 to S317, the CPU 1 organizes these lines based on paragraph (character region). This is because whether to equally space characters is determined based on paragraph (character region) in many cases. First, the CPU 1 executes processing in order from the first line. In step S315, the CPU 1 determines whether the first line and the next line belong to the same paragraph based on whether the two lines are equal in line space or font size. If the two lines are determined to belong to the same paragraph (YES in step S315), then in step S316, the CPU 1 determines whether any line follows. If any line follows (YES in step S316), the processing returns to step S315 to determine whether the lines belong to the same paragraph.

On the other hand, if the CPU 1 determines that the two lines do not belong to the same paragraph in step S315 (NO in step S315), the processing advances to step S317. In step S317, the CPU 1 categorizes the line as a new paragraph and determines whether the line and the next line belong to the new paragraph.

In step S318, the CPU 1 determines whether characters in lines of each paragraph are equal-spaced. If the paragraph satisfies the following conditions, the CPU 1 determines lines in the paragraph as equal-spaced lines.

(1) Rightmost positions of lines in each paragraph are almost aligned.
(2) An offset between a leftmost position of the first line and a leftmost position of another line falls within a predetermined amount (indent).
(3) The number of conceivable values of character spacing amounts of each line is 1 or 2 based on a distribution of character spacing amounts of each line, provided that character spacing amounts within the predetermined offset are considered equal to each other.

In the example illustrated in FIG. 4A, a line space between the first and the second lines is within a predetermined amount (e.g., twice or less as high as a character height) and characters of the first and second lines have substantially the same size, so that the CPU 1 determines that the two lines belong to the same paragraph. In addition, the rightmost position of the first line and the rightmost position of the second line are almost aligned. Further, the leftmost positions are almost aligned within a predetermined offset. Moreover, the number of conceivable spacing amounts of inter-character spaces of each line is 2 (i.e., a distance of the inter-character space and a distance between words). Therefore, the CPU 1 determines that lines in the example illustrated in FIG. 4A are equal-spaced lines (4-7).

In this way, the CPU 1 executes determination as to equal space on all lines and paragraphs in the document, and the processing returns to the flowchart illustrated in FIG. 2 and starts with step S204.

Figure 5:
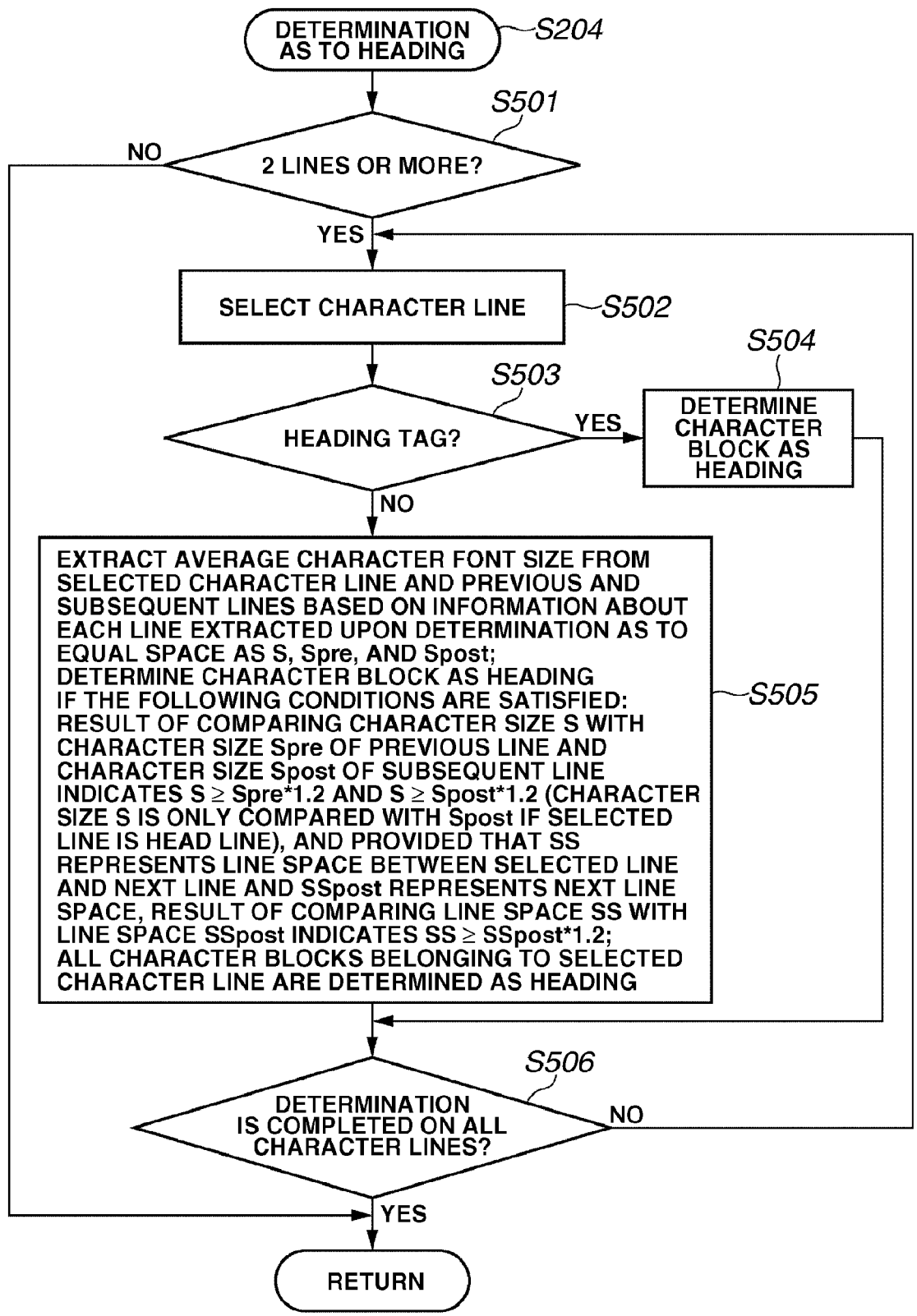
FIG. 5 is a flowchart of an example of a procedure of determination as to heading illustrated in FIG. 2 according to an exemplary embodiment of the present invention.

FIG. 5 is a flowchart of a detailed procedure of the determination as to heading in step S204 illustrated in FIG. 2.

In step S501, the CPU 1 determines whether two or more lines are included in the document. As for the lines, target lines are extracted in equal space determination in step S203. Thus, those lines are used here. If two or more lines are found (YES in step S501), the processing advances to step S502. If only one line is found (NO in step S501), the CPU 1 cannot perform determination as to heading and, thus, terminates the processing. The processing then advances to step S205 illustrated in FIG. 2.

In step S502, the CPU 1 selects a character line as a processing target. The CPU 1 first selects the first character line.

Next, in step S503, the CPU 1 determines whether a character block included in the selected line is a heading based on whether a heading tag is added. That is, some documents describe information as to heading with a tag, so that the CPU 1 checks the tag. In the present exemplary embodiment, the PDF document is used, so that the CPU 1 determines whether information as to heading is described as a heading tag. Further, if the document is an HTML file, the CPU 1 executes determination based on /H tag (H1 to H6 tags).

If the character block is a heading (YES in step S503), the CPU 1 advances to step S504 and sets a corresponding character block as a heading. In this case, a heading character block and another character block may exist in the same line. Next, the processing advances to step S506.

If a heading tag is not found in step S503 (NO in step S503), the processing advances to step S505. In step S505, the CPU 1 executes determination as to heading based on the following character lines.

First, the CPU 1 extracts average character sizes from the selected character line, a previous line, and a subsequent line and defines the sizes as S, Spre, and Spost, respectively. The character size S of the selected line is compared with the character size Spre of the previous line and the character size Spost of the subsequent line. If the selected line as a processing target is the first line, its character size is compared with only the character size Spost.

Further, a line space between the selected character line and the next line is set as SS and a line space between the next line and a line after the next line is set as SSpost. The CPU 1 compares the line space SS with the next line space Sspost.

At this time, the CPU 1 determines that the selected character line is a heading if the following conditions are satisfied:

$S \geq Spre \times 1.2$ and $S \geq Spost \times 1.2$ (If the selected line is the first line, its size is only compared with Spost), and $SS \geq SSpost \times 1.2$.

In this case, all character blocks belonging to the line of the selected character block are all considered as a heading.

The CPU 1 calculates a line space based on a value representing the line space, such as a TD operator that specifies a vertical offset.

Figure 6:
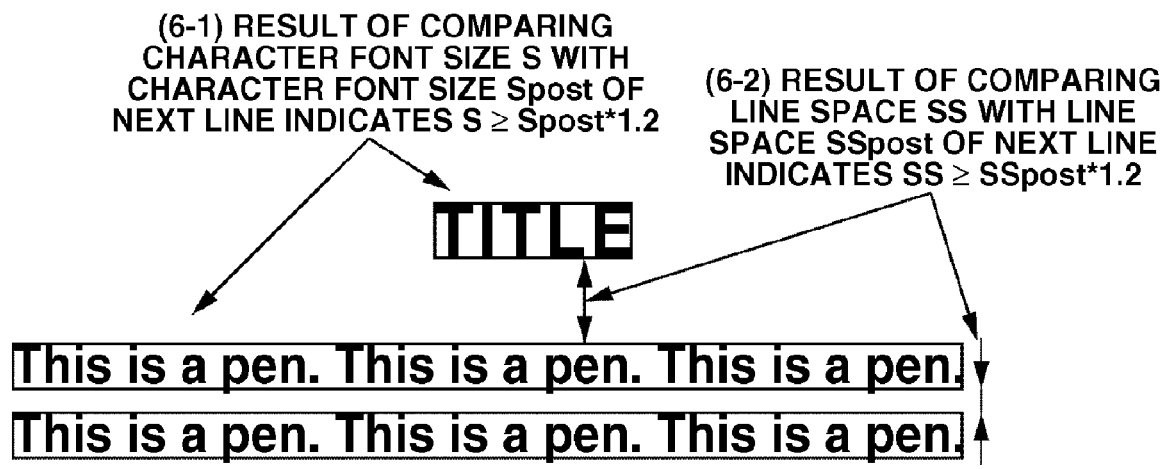
FIG. 6 illustrates an example of the determination as to heading illustrated in FIG. 5 according to an exemplary embodiment of the present invention.

FIG. 6 illustrates determination as to heading, and (6-1) corresponds to character size comparison. The CPU 1 first selects the first line as a processing target and compares its character size with that of the next line. In the example illustrated in FIG. 6, a relationship of $S \geq Spost \times 1.2$ is satisfied. Next, the CPU 1 compares line space amounts as indicated by (6-2). In the example illustrated in FIG. 6, a relationship of $SS \geq SSpost \times 1.2$ is satisfied. The first line is considered a heading based on the above result.

Next, in step S506, the CPU 1 determines whether determination as to heading is completed on all lines. If any line remains to be processed (NO in step S506), the CPU 1 returns to step S502 to select the next line and to perform determination as to heading on the next character line. On the other hand, if all character lines have been processed (YES in step S506), the CPU 1 terminates determination as to heading processing and advances to step S205 illustrated in FIG. 2.

Figure 7:
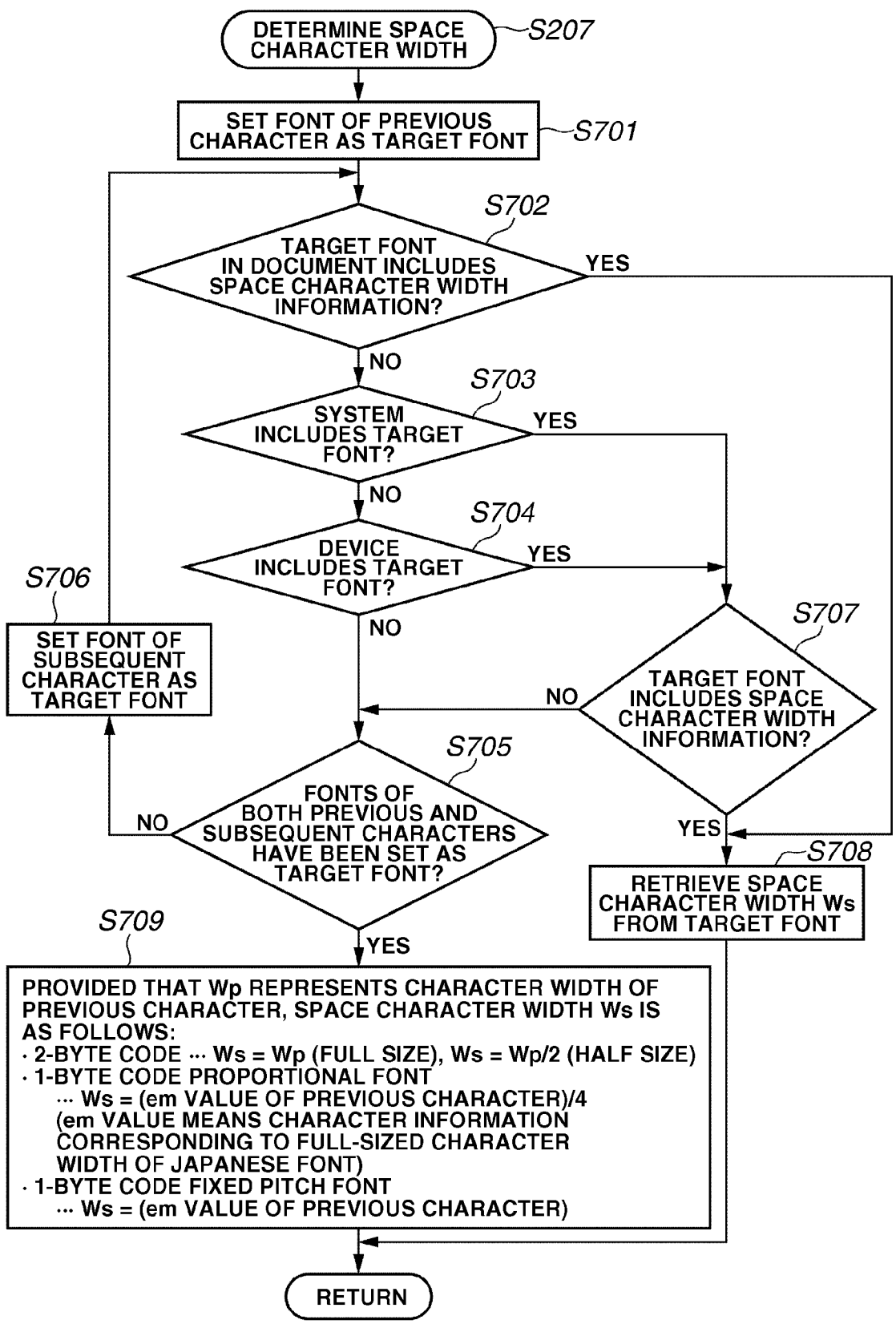
FIG. 7 is a flowchart of an example of a procedure for determining a space character width illustrated in FIG. 2 according to an exemplary embodiment of the present invention.

FIG. 7 is a flowchart of a detailed procedure for acquiring a space character width in step S207 illustrated in FIG. 2.

In step S701, the CPU 1 determines a font type of a character preceding a target inter-character space and sets the determined font type as a target font. Next, in step S702, the CPU 1 determines whether a target font of the document includes information about the space character width. As for the PDF document, "Widths" information of a font dictionary may include glyph font width information. Thus, the CPU 1 checks whether the information includes space character width information. Further, if the document includes space character code described in the same font, the CPU 1 can use character width information thereof. If the space character width information is obtained (YES in step S702), the processing advances to step S708. In step S708, the CPU 1 sets the space character width as Ws.

On the other hand, if the CPU 1 cannot acquire space character width information from the document in step S702 (NO in step S702), the processing advances to step S703. In step S703, the CPU 1 determines whether the target font is included in a system (OS or other such systems of the document processing apparatus). If the target font is installed on the system, space character width information can be obtained based on the font type. If the system stores the target font (YES in step S703), the processing advances to step S707. In step S707, the CPU 1 determines whether the target font in the system includes space character width information. If the target font includes space character width information (YES in step S707), the processing advances to step S708. In step S708, the CPU 1 sets the space character width as Ws. If the target font includes no space character width information (NO in step S707), the processing advances to step S705.

In step S703, if the system (document processing apparatus) does not include the target font (NO in step S703), the processing advances to step S704. In step S704, the CPU 1 determines whether the target font is stored in an external device (e.g., printer) connected via a network (whether the font is installed on the device). If the device stores the target font (YES in step S704), the processing advances to step S707. In step S707, the CPU 1 determines whether the target font includes space character width information. If the target font includes space character width information (YES in step S707), the processing advances to step S708 to set the space character width as Ws. If the target font includes no space character width information (NO in step S707), the processing advances to step S705.

In step S704, if the device does not store the target font (NO in step S704), the processing advances to step S705. In step S705, the CPU 1 determines whether fonts of characters preceding and succeeding the target inter-character space are set as a target font. If determination as to the font of the previous character is completed but determination as to the font of the subsequent character is not completed (NO in step S705), then in step S706, the CPU 1 sets the font of the character following the target inter-character space as a target font and advances to step S702 to acquire space character width information as described above. If determination as to the fonts of the characters preceding and succeeding the target inter-character space is completed (YES in step S705), that is, the CPU 1 fails in acquiring space character width information from the fonts of the previous and subsequent characters, the processing advances to step S709.

In step S709, the CPU 1 estimates a space character width. If a character width of a previous character is Wp, the CPU 1 estimates the space character width Ws as follows.

If the previous character is a 2-byte code, Ws=Wp (full size) and Ws=Wp/2 (half size).

If the previous character is a proportional font of 1-byte code, Ws=(em value of the previous character)/4 (em value means character width information corresponding to a full-sized character width of a Japanese font).

If the previous character is a fixed pitch font of 1-byte code, Ws=(em value of the previous character).

At this point, the CPU 1 completes determination of the space character width and advances to step S208 illustrated in FIG. 2.

Figure 8:
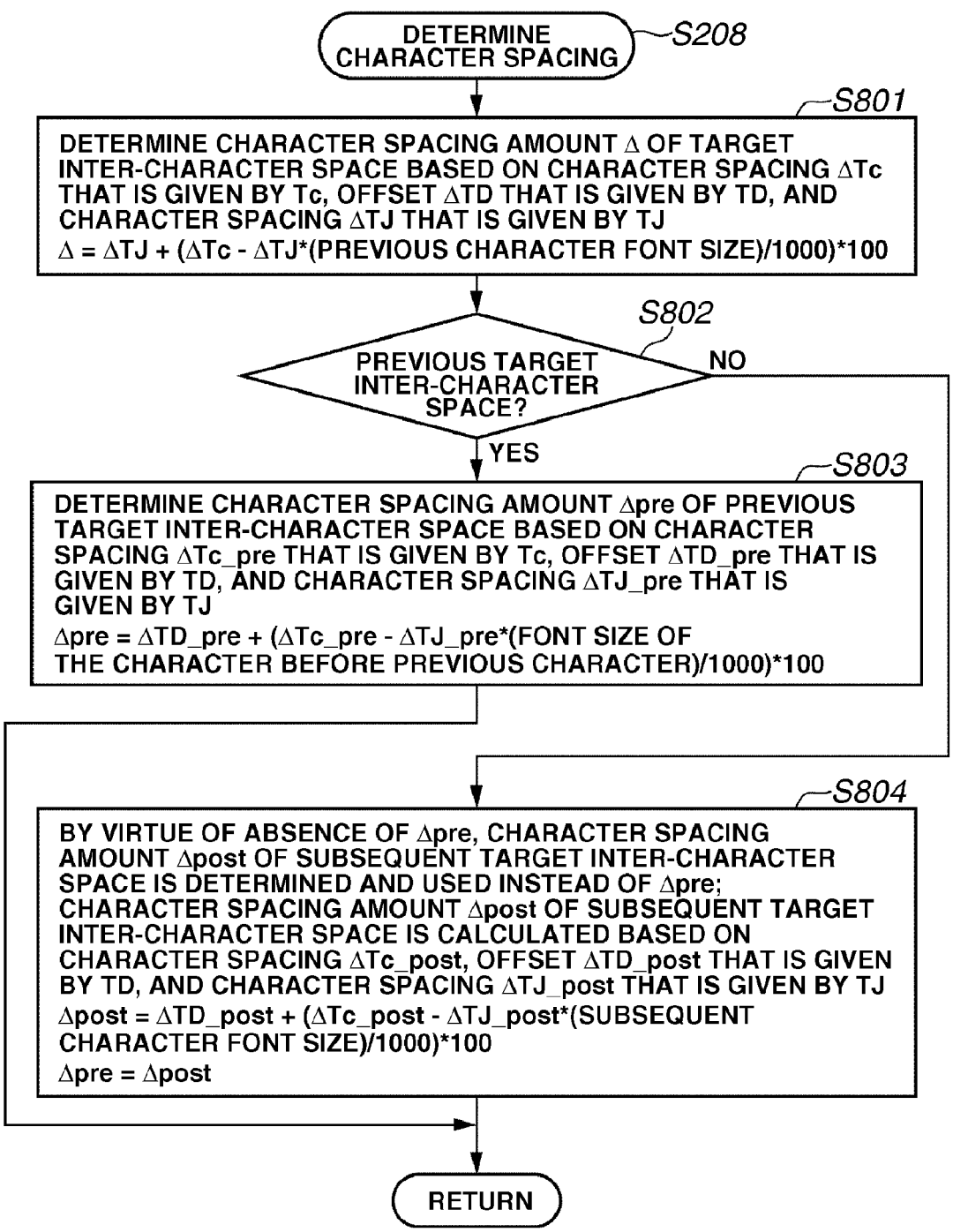
FIG. 8 is a flowchart of an example of a procedure for determining a character spacing illustrated in FIG. 2 according to an exemplary embodiment of the present invention.
Figure 9A:
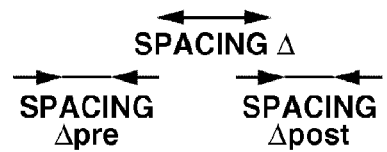
FIGS. 9A and 9B illustrate an example of the character spacing illustrated in FIG. 8 according to an exemplary embodiment of the present invention.
Figure 9A:
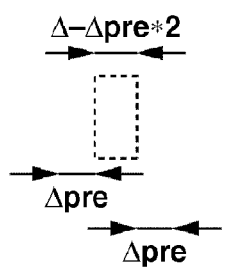
Figure 9B:
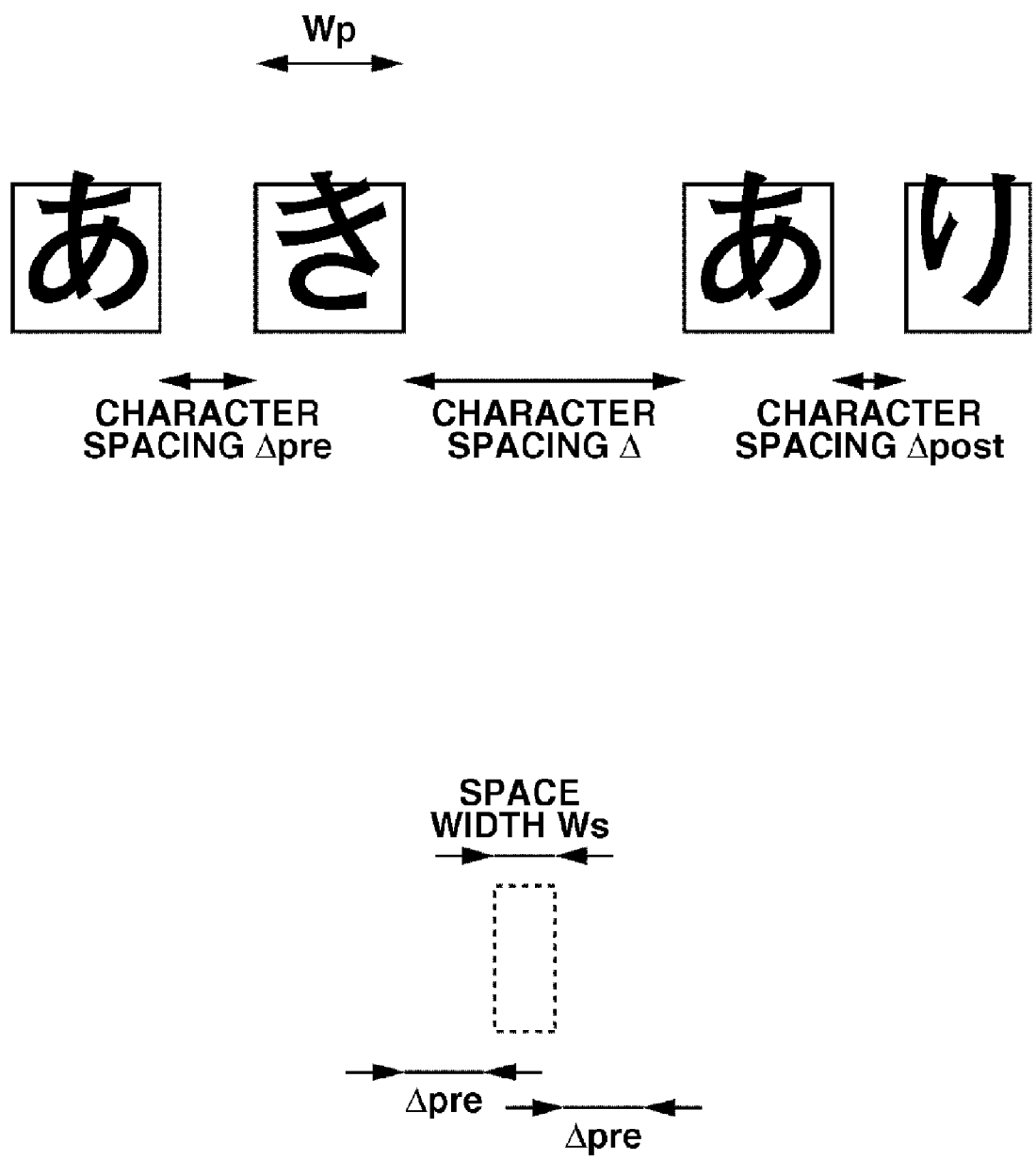

Referring to a flowchart illustrated in FIG. 8, the calculation of the character spacing in step S208 illustrated in FIG. 2 is described. FIGS. 9A and 9B illustrate a character spacing amount Δ. For example, FIG. 9A illustrates the case of calculating a character spacing amount Δ between "s" of "This" and "i" of "is".

In step S801, the CPU 1 determines a character spacing amount Δ of the target inter-character space. For example, a character spacing specified by the Tc operator is set as ΔTc, a horizontal offset specified by the TD operator is set as ΔTD, and a character spacing specified by the TJ operator is set as ΔTJ.

At this time, the character spacing is given by the following expression.

$$\Delta = \Delta TD + (\Delta Tc - \Delta TJ) \times (\text{font size of the previous character})/1000) \times 100$$

Next, in step S802, the CPU 1 determines whether a previous target inter-character space is found. If found (YES in step S802), the processing advances to step S803. If not found (NO in step S802), the processing advances to step S804.

In step S803, the CPU 1 determines a character spacing amount Δpre of the previous target inter-character space based on a previous character spacing ΔTc_pre, an offset ΔTD_pre specified by TD, and a character spacing ΔTJ_pre specified by TJ.

$$\Delta pre = \Delta TD\_pre + (\Delta Tc\_pre - \Delta TJ\_pre) \times (\text{font size of a character before the previous character})/1000) \times 100$$

After the calculation of Δpre, the CPU 1 terminates the processing for determining a character spacing and advances to step S209 illustrated in FIG. 2.

In step S804, the CPU 1 calculates a character spacing amount Δpost of a subsequent target inter-character space and uses the calculated amount in place of the amount Δpre of the previous one. The character spacing amount Δpost of the subsequent target inter-character space is determined based on a subsequent character spacing ΔTc_post, an offset ΔTD_post specified by TD, and a character spacing ΔTJ_post specified by TJ. Substituting the calculated amount Δpost into Δpre gives the following expression.

$$\Delta post = \Delta TD\_post + (\Delta Tc\_post - \Delta TJ\_post) \times (\text{font size of the subsequent character})/1000) \times 100.$$

$$\Delta pre \leftarrow \Delta post$$

After the calculation of Δpre, the CPU 1 terminates the processing for determining a character spacing and advances to step S209 illustrated in FIG. 2.

In the example illustrated in FIG. 9A, a previous target inter-character space (a space between "i" and "s" of "This") exits, so that the CPU 1 calculates Δpre in step S803.

Figure 10:
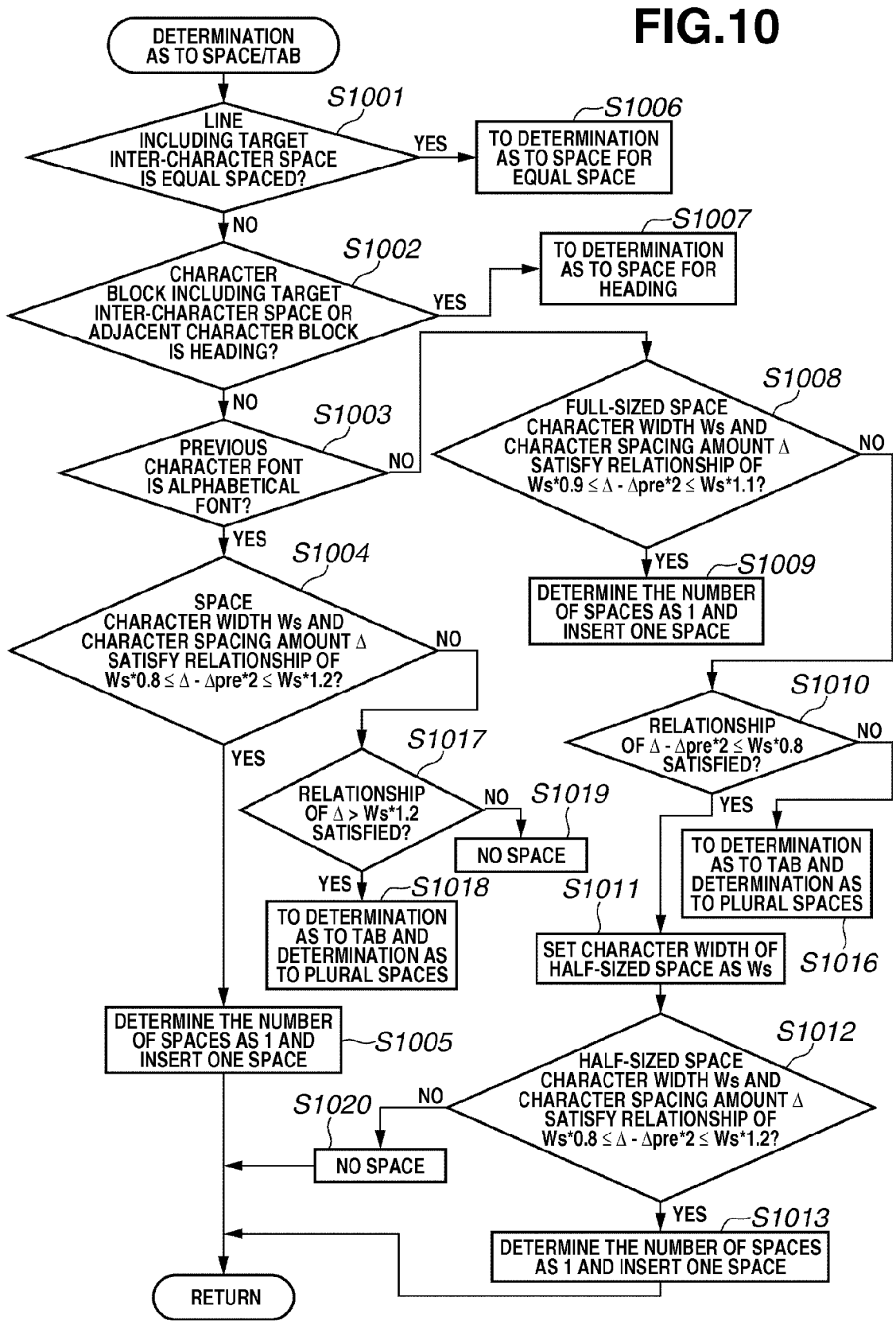
FIG. 10 is a flowchart of an example of a procedure of determination as to space/tab illustrated in FIG. 2 according to an exemplary embodiment of the present invention.

FIG. 10 is a flowchart of an example of a detailed procedure of the space/tab determination in step S209 illustrated in FIG. 2.

First, in step S1001, the CPU 1 determines whether a line including a target inter-character space is equal-spaced. If equal-spaced (YES in step S1001), the processing advances to step S1006 to execute determination as to a space for equal space (see FIG. 11). If not equal-spaced (NO in step S1001), the processing advances to step S1002.

In step S1002, the CPU 1 determines whether a character block including a target inter-character space or an adjacent character block is a heading. If either one is a heading (YES in step S1002), the processing advances step S1007 for determination as to a space for heading (see FIG. 12). If neither block is a heading (NO in step S1002), the processing advances to step S1003.

In step S1003, the CPU 1 determines whether a previous character has an alphabetical font. If the font of the previous character is an alphabetical font (YES in step S1003), the processing advances to step S1004. If the font of the previous character is not an alphabetical font (NO in step S1003), the processing advances to step S1008.

In step S1004, the CPU 1 executes determination as to a space for alphabetical font. That is, the CPU 1 determines whether the space character width Ws and the character spacing amount Δ satisfy the following relationship:

$$Ws \times 0.8 \leq (\Delta - \Delta pre \times 2) \leq Ws \times 1.2.$$

What the above conditional expression expresses would be understood from a relationship between the character spacing Δ illustrated in FIG. 9A, the space character width Ws, and the character spacing Δpre. That is, the CPU 1 estimates a character spacing between "This" and "space character" as Δpre and also estimates a character spacing between "space character" and "is" as Δpre. As a result, the calculated space character width corresponds to a value obtained by subtracting two character spacing amounts Δpre from the character spacing Δ between "This" and "is". Therefore, if (Δ−Δpre×2) is close to the space character width Ws, that is, the above conditional expression is satisfied, the CPU 1 determines that one space exits.

Here, only a space width may be variable in an alphabetical font, but in this case, Δpre=0, so that the same determination can be performed regardless of whether only the space width or inter-character space in a word is variable.

If the condition is satisfied (YES in step S1004), the CPU 1 advances to step S1005. In step S1005, the CPU 1 determines that one space exists, and then inserts one space into the target inter-character space. If the condition is not satisfied (NO in step S1004), the CPU 1 advances to step S1017.

In step S1017, the CPU 1 further examines the case where the character spacing is larger than one space.

If a relationship of Δ>Ws×1.2 is satisfied (YES in step S1017), the CPU 1 advances to step S1018 to execute tab determination/determination as to plural spaces. If the relationship is not satisfied (NO in step S1017), the CPU 1 determines that no space exits and terminates the space determination processing. Then, the processing advances to step S210 illustrated in FIG. 2.

A description is given of an example where the font of the previous character is not an alphabetical font in step S1003.

The processing advances to step S1008, in which the CPU 1 determines whether the full-sized space character width Ws and the character spacing amount Δ satisfy the following relationship: Ws×0.9≦(Δ−Δpre×2)≦Ws×1.1. What the conditional expression expresses would be understood from a relationship between the character spacing A illustrated in FIG. 9B, the space width Ws, and the character spacing Δpre. That is, when one space character is inserted, the estimated space width corresponds to a value obtained by subtracting two character spacing amounts Δpre from the character spacing Δ. If the estimated space width is close to the actual space width, the CPU 1 can determine that one space exists. As compared with the processing of the alphabetical document in step S1004, a space in the Japanese document is close to the full-sized space character width Ws in many cases, so that a threshold value is more strictly determined in the conditional expression.

If the conditional expression is satisfied (YES in step S1008), the processing advances to step S1009, in which the CPU 1 determines that one full-sized space exists and inserts the space into the target inter-character space. If the conditional expression is not satisfied (NO in step S1008), the processing advances to step S1010.

In step S1010, the CPU 1 determines whether the inter-character space is smaller than one full-sized space. That is, the CPU 1 determines whether a relationship of $(\Delta-\Delta pre \times 2) < Ws \times 0.8$ is satisfied.

If satisfied (YES in step S1010), the processing advances to step S1011 to set a half-sized space character width as Ws. If not satisfied (NO in step S1010), the processing advances to step S1016 to perform determination as to tab and determination as to plural spaces.

A description is given of the case where the relationship is satisfied. In step S1012, the CPU 1 determines whether the half-sized space character width Ws and the character spacing amount $\Delta$ satisfy the following relationship:

$$Ws \times 0.8 \leq (\Delta-\Delta pre \times 2) \leq Ws \times 1.2.$$

If satisfied (YES in step S1012), the processing advances to step S1013, in which the CPU 1 determines that one half-sized space exists and inserts the space into the target inter-character space. If not satisfied (NO in step S1012), the processing advances to step S1020, in which the CPU 1 determines that no space exists and terminates space determination processing.

Figure 11:
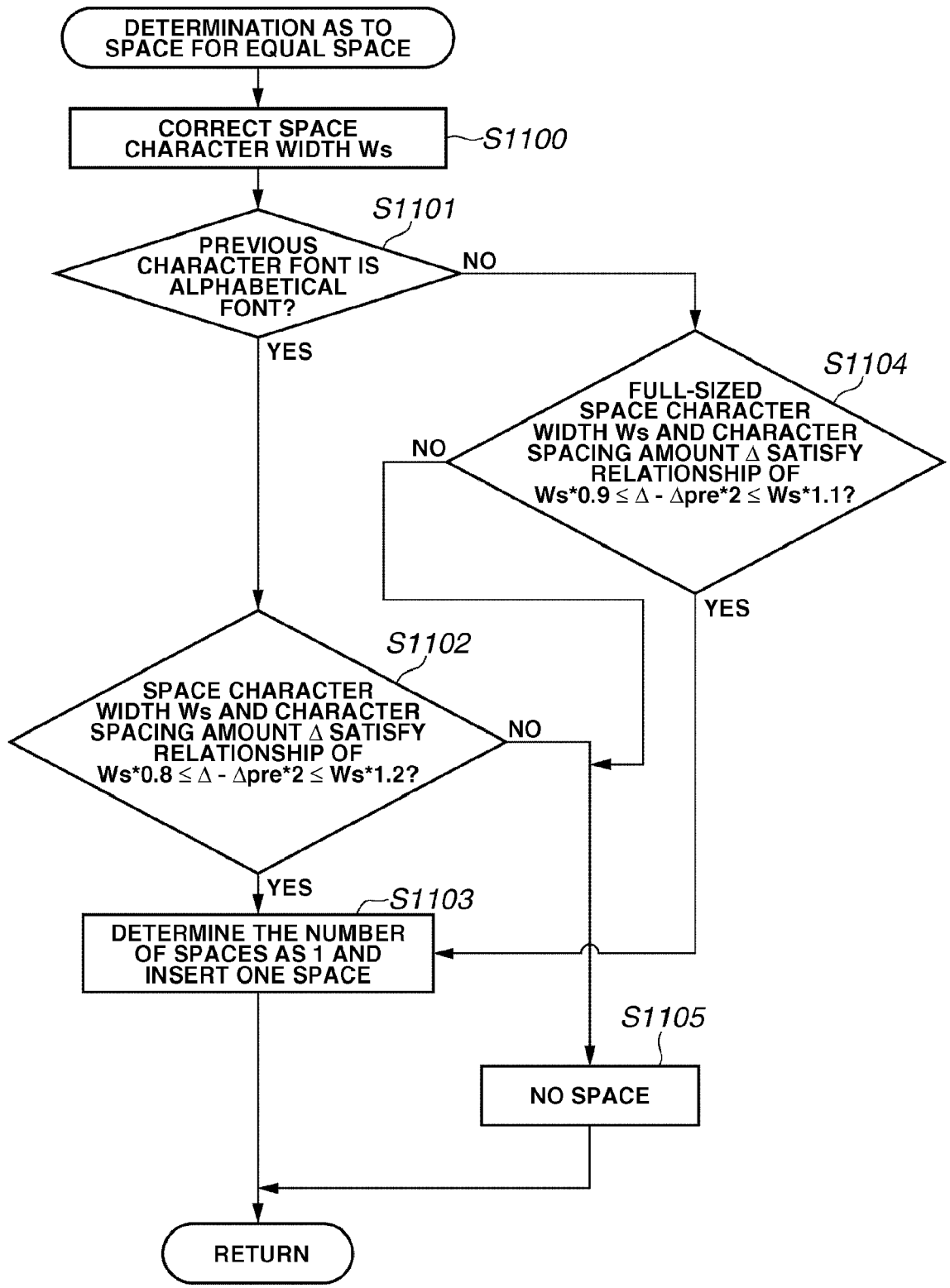
FIG. 11 is a flowchart of an example of a procedure of determination as to a space for equal space illustrated in FIG. 10 according to an exemplary embodiment of the present invention.

Referring to a flowchart illustrated in FIG. 11, the determination as to a space for equal space in step S1006 illustrated in FIG. 10 is described.

In step S1100, the CPU 1 determines an equal space amount and adjusts the space character width Ws based on the determined amount.

(Line width)=(rightmost position of line)−(leftmost position of line)

(Reference line width)=(the total width of characters)

(Adjusted space character width)=(space character width Ws)×(line width)÷(reference line width)

The space character width Ws is replaced by the adjusted space character width.

Next, in step S1101, the CPU 1 determines whether the font of a previous character is an alphabetical font. If the font is an alphabetical font (YES in step S1101), the processing advances to step S1102. If the font is not an alphabetical font (NO in step S1101), the processing advances to step S1104. A description is given of an example where the font is an alphabetical font. In step S1102, the CPU 1 determines whether the space character width Ws and the character spacing amount $\Delta$ satisfy a condition of $Ws \times 0.8 \leq (\Delta-\Delta pre \times 2) \leq Ws \times 1.2$.

If the condition is satisfied (YES in step S1102), the processing advances to step S1103, in which the CPU 1 determines that one space exists and inserts one space into the target inter-character space and terminates the space determination processing. If the condition is not satisfied (NO in step S1102), the processing advances to step S1105, in which the CPU 1 determines that no space exists and terminates the space determination processing.

A description is given of the case where the font is not an alphabetical font in step S1101. In step S1104, the CPU 1 determines whether the full-sized space character width Ws and the character spacing amount $\Delta$ satisfy the following condition:

$$Ws \times 0.9 \leq (\Delta-\Delta pre \times 2) \leq Ws \times 1.1.$$

If the condition is satisfied (YES in step S1104), the processing advances to step S1103, in which the CPU 1 determines that one space exists and inserts one space into the target inter-character space and terminates the space determination processing. If the condition is not satisfied (NO in step S1104), the processing advances to step S1105, in which the CPU 1 determines that no space exists and terminates the space determination processing.

Here, a space $(\Delta-\Delta pre \times 2)$ in the Japanese document is close to the full-sized space character width Ws in many cases, so that a threshold value is more strictly determined in the conditional expression than the conditional expression in step S1102.

Figure 12:
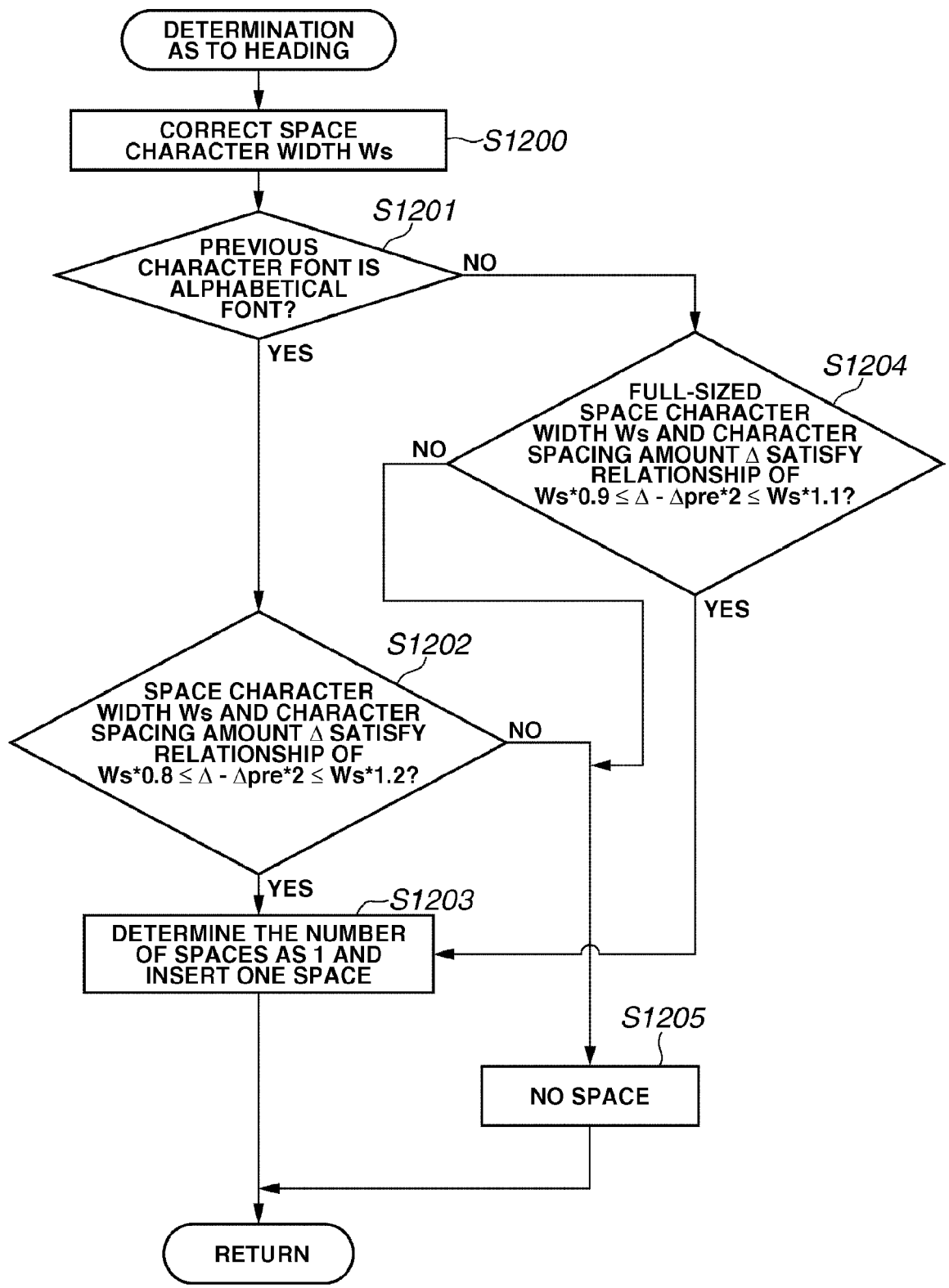
FIG. 12 is a flowchart of an example of a procedure of determination as to a space for heading illustrated in FIG. 10 according to an exemplary embodiment of the present invention.

Referring to a flowchart illustrated in FIG. 12, the determination as to a space for heading in step S1007 illustrated in FIG. 10 is described.

In step S1200, the CPU 1 corrects the space character width Ws.

As for a heading, since a character may be deformed into a vertically or horizontally long shape, the space character width Ws is adjusted if necessary.

For example, in a PDF document, deformation is expressed by matrix-transforming X and Y coordinates. Considering that the coordinates (X, Y) are subjected to matrix transformation with (a, b, c, d) into (X', Y'), X' and Y' are expressed as follows:

$$X'=aX+bY$$

$$Y'=cX+dY$$

In general, $\Delta$ and $\Delta pre$ are subjected to similar coordinate transformation, so that it is unnecessary to correct the space character width Ws. However, in the case where coordinates are transformed at some midpoint of the heading, the CPU 1 corrects the space character width Ws with the original transform matrix and executes space determination based on untransformed coordinates and transformed coordinates.

(Corrected space character width)=$a$×(space character width Ws)+$b$×(space character height).

$\Delta$=(starting position of character)−(end position of previous character).

Here, $\Delta pre$ is a coordinate-transformed value and thus used as it is.

In step S1201, the CPU 1 determines whether the font of a previous character is an alphabetical font. If the font is an alphabetical font (YES in step S1201), the processing advances to step S1202. If the font is not an alphabetical font (NO in step S1201), the processing advances to step S1204. A description is made of the case where the font is an alphabetical font. In step S1202, the CPU 1 determines whether the space character width Ws and the character spacing amount $\Delta$ satisfy the following condition:

$$Ws \times 0.8 \leq (\Delta-\Delta pre \times 2) \leq Ws \times 1.2.$$

If the condition is satisfied (YES in step S1202), the processing advances to step S1203, in which the CPU 1 determines that one space exists and inserts one space into the target inter-character space. Then, the CPU 1 terminates the space determination processing. If the condition is not satisfied (NO in step S1202), the processing advances to step S1205, in which the CPU 1 determines that no space exists and terminates the space determination processing.

A description is made of the case where the font is not an alphabetical font in step S1201. In step S1204, the CPU 1 determines whether the full-sized space character width Ws and the character spacing amount Δ satisfy the following condition:

$$Ws \times 0.9 \leq (\Delta - \Delta \text{pre} \times 2) \leq Ws \times 1.1.$$

If satisfied (YES in step S1204), the processing advances to step S1203, in which the CPU 1 determines that one space exists and inserts one space into the target inter-character space. Then, the CPU 1 terminates the space determination processing. If not satisfied (NO in step S1204), the processing advances to step S1205, in which the CPU 1 determines that no space exists and terminates the space determination processing.

Figure 13:
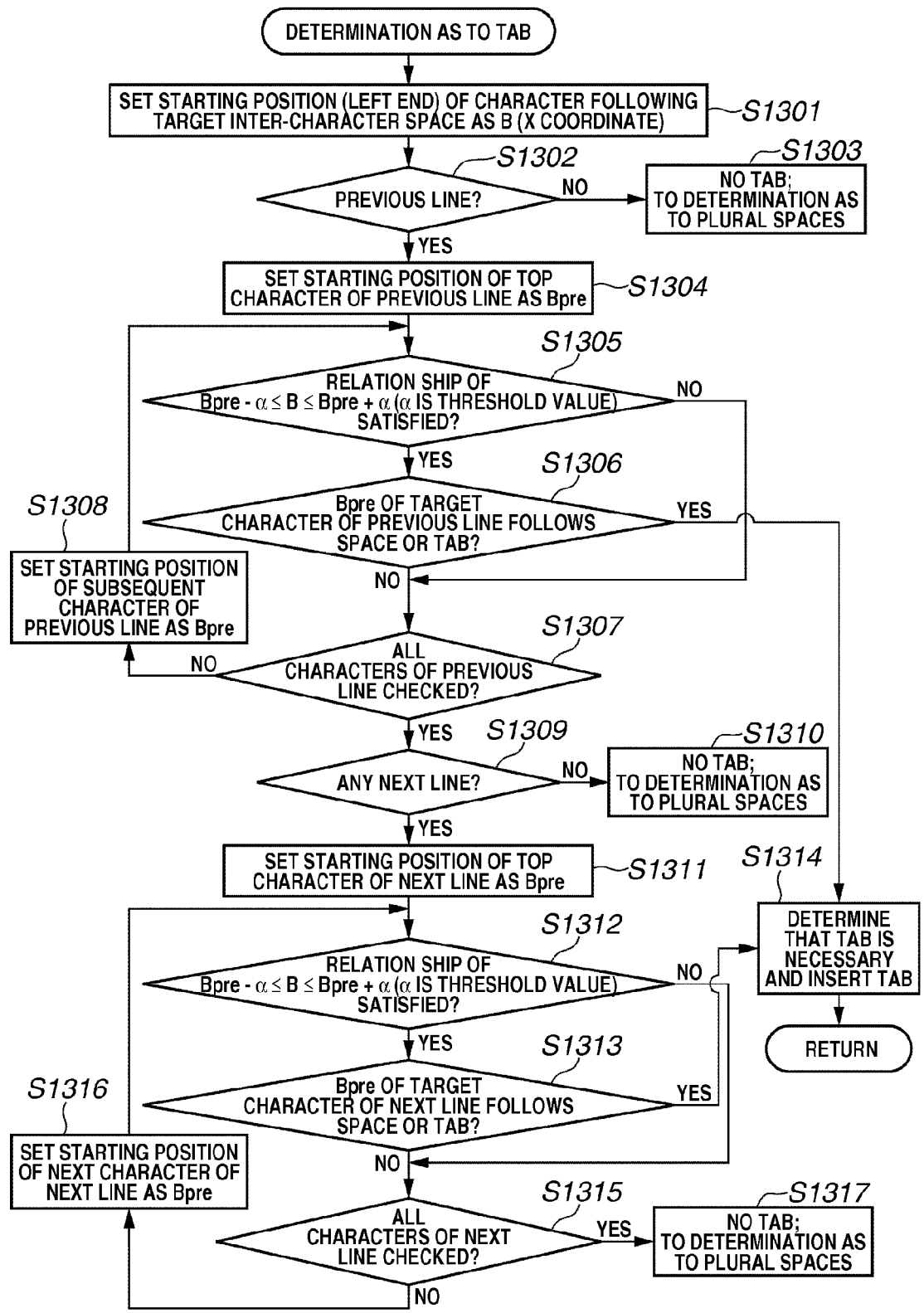
FIG. 13 is a flowchart of an example of a procedure of tab determination in determination as to a tab and determination as to plural spaces illustrated in FIG. 10 according to an exemplary embodiment of the present invention.
Figure 14:
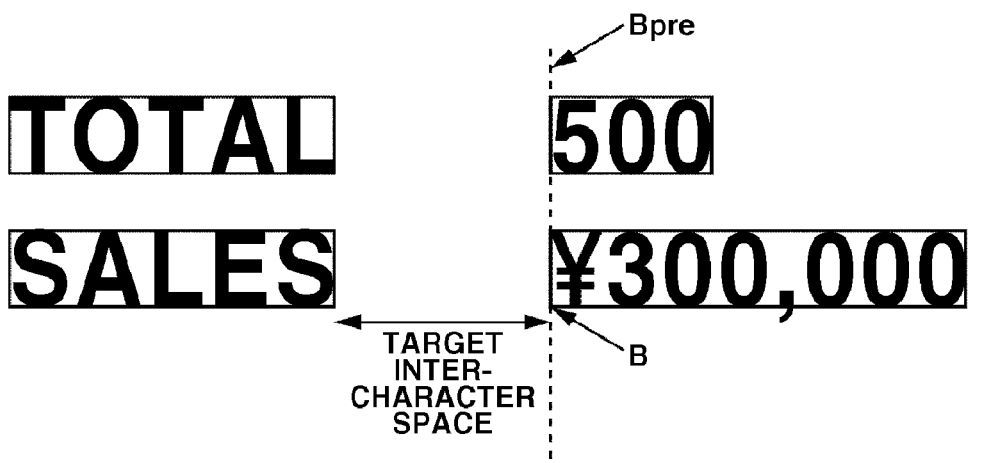
FIG. 14 illustrates an example of the determination as to a tab illustrated in FIG. 13 according to an exemplary embodiment of the present invention.

Referring to a flowchart illustrated in FIG. 13, a description is given of the determination as to tab in the determination as to tab and determination as to plural spaces in steps S1016 and S1018 illustrated in FIG. 10 based on the tab determination example illustrated in FIG. 14.

In step S1301, the CPU 1 sets a starting position (leftmost position) of a character following the target inter-character space as B (X coordinate) (see FIG. 14).

Next, in step S1302, the CPU 1 determines whether a previous line is found. If found (YES in step S1302), the processing advances to step S1304. If not found (NO in step S1302), the processing advances to step S1303, in which the CPU 1 determines that no tab exists and then starts determination as to plural spaces (see FIG. 15).

In step S1304, the CPU 1 sets a starting position of the top character of the previous line as Bpre (see FIG. 14). Next, in step S1305, the CPU 1 determines whether the following condition is satisfied:

$$B\text{pre} - \alpha \leq B \leq B\text{pre} + \alpha \text{ ($\alpha$ is a threshold value)}.$$

If satisfied (YES in step S1305), the processing advances to step S1306. In step S1306, the CPU 1 determines whether any space or tab exists before the target character Bpre of the previous line. The target character is, for example, "5" of "500" in FIG. 14. If any tab or space exists (YES in step S1306), then in step S1314, the CPU 1 determines that a tab exists and inserts the tab into the target inter-character space.

In step S1305 or step S1306, if the conditions is not satisfied (NO in step S1305 or S1306), the processing advances to step S1307, in which the CPU 1 determines whether all characters of the previous line have been processed.

If already processed (YES in step S1307), the processing advances to step S1309. On the other hand, if any character remains to be processed (NO in step S1307), the processing advances to step S1308, in which the CPU 1 sets a starting position of the next character of the previous line as Bpre. The processing then returns to step S1305 to perform determination as described above. The CPU 1 repeats this processing.

In step S1309, the CPU 1 determines whether the next line is found. If not found (NO in step S1309), the processing advances to step S1310, in which the CPU 1 determines that no tab exists and starts the determination as to plural spaces. If found (YES in step S1309), the processing advances to step S1311.

In step S1311, the CPU 1 sets a starting position of the top character of the next line as Bpre.

Next, in step S1312, the CPU 1 determines whether the following condition is satisfied:

$$B\text{pre} - \alpha \leq B \leq B\text{pre} + \alpha \text{ ($\alpha$ is a threshold value)}.$$

If satisfied (YES in step S1312), the processing advances to step S1313. In step S1313, the CPU 1 determines whether any space or tab exists before the target character Bpre of the next line. If any tab or space exists (YES in step S1313), then in step S1314, the CPU 1 determines that a tab exists and inserts the tab into the target inter-character space.

On the other hand, if the condition is not satisfied in step S1312 or step S1313 (NO in step S1312 or S1313), the processing advances to step S1315, in which the CPU 1 determines whether all characters of the next line have been processed.

If already processed (YES in step S1315), the processing advances to step S1317. On the other hand, if any character remains to be processed (NO in step S1315), the processing advances to step S1316, in which the CPU 1 sets a starting position of the next character of the next line as Bpre. The processing then returns to step S1312 to perform determination as described above. The CPU 1 repeats this processing.

In step S1317, the CPU 1 determines that no tab exists and starts the determination as to plural spaces.

Figure 15:
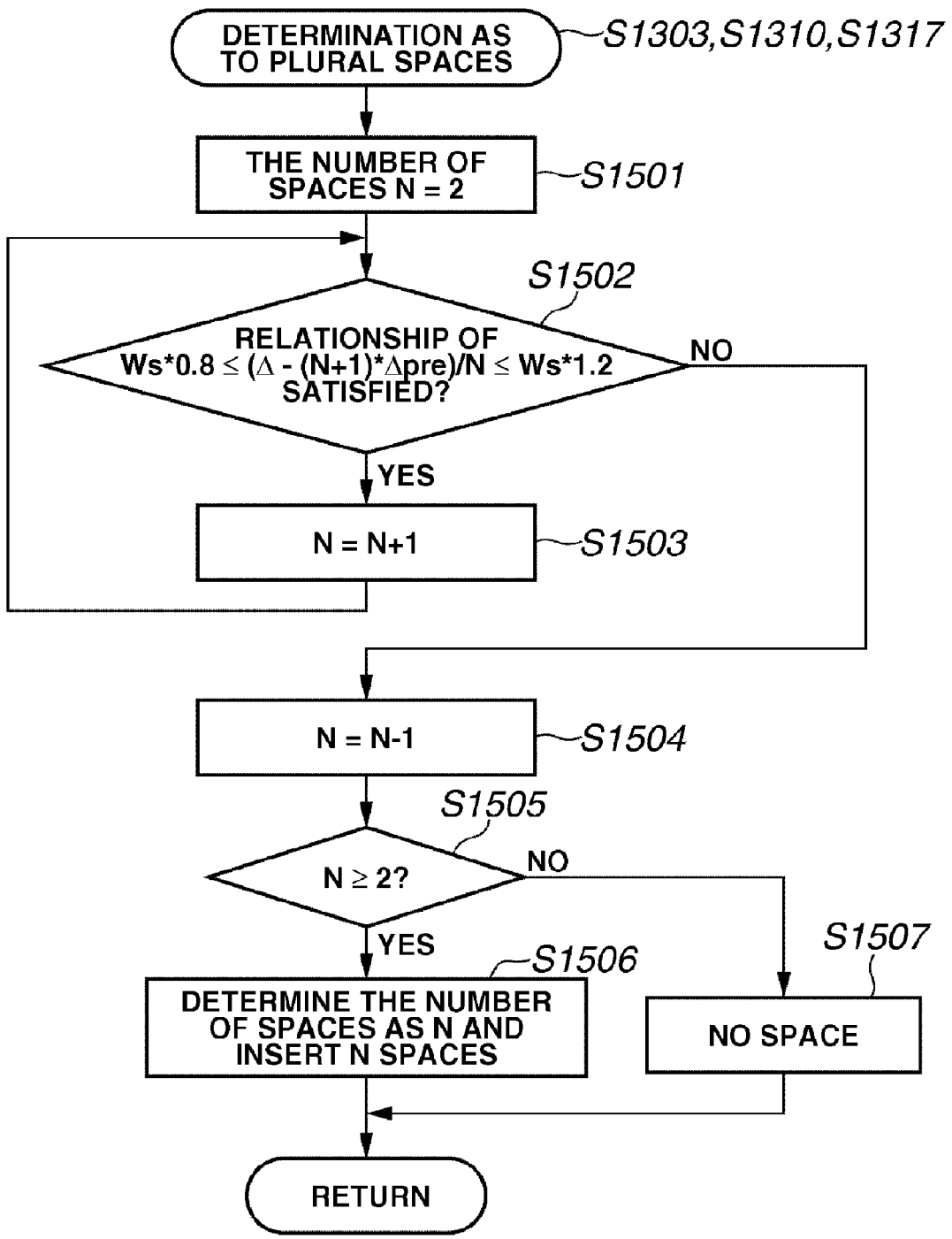
FIG. 15 is a flowchart of an example of a procedure of determination as to plural spaces illustrated in FIG. 13 according to an exemplary embodiment of the present invention.
Figure 16:
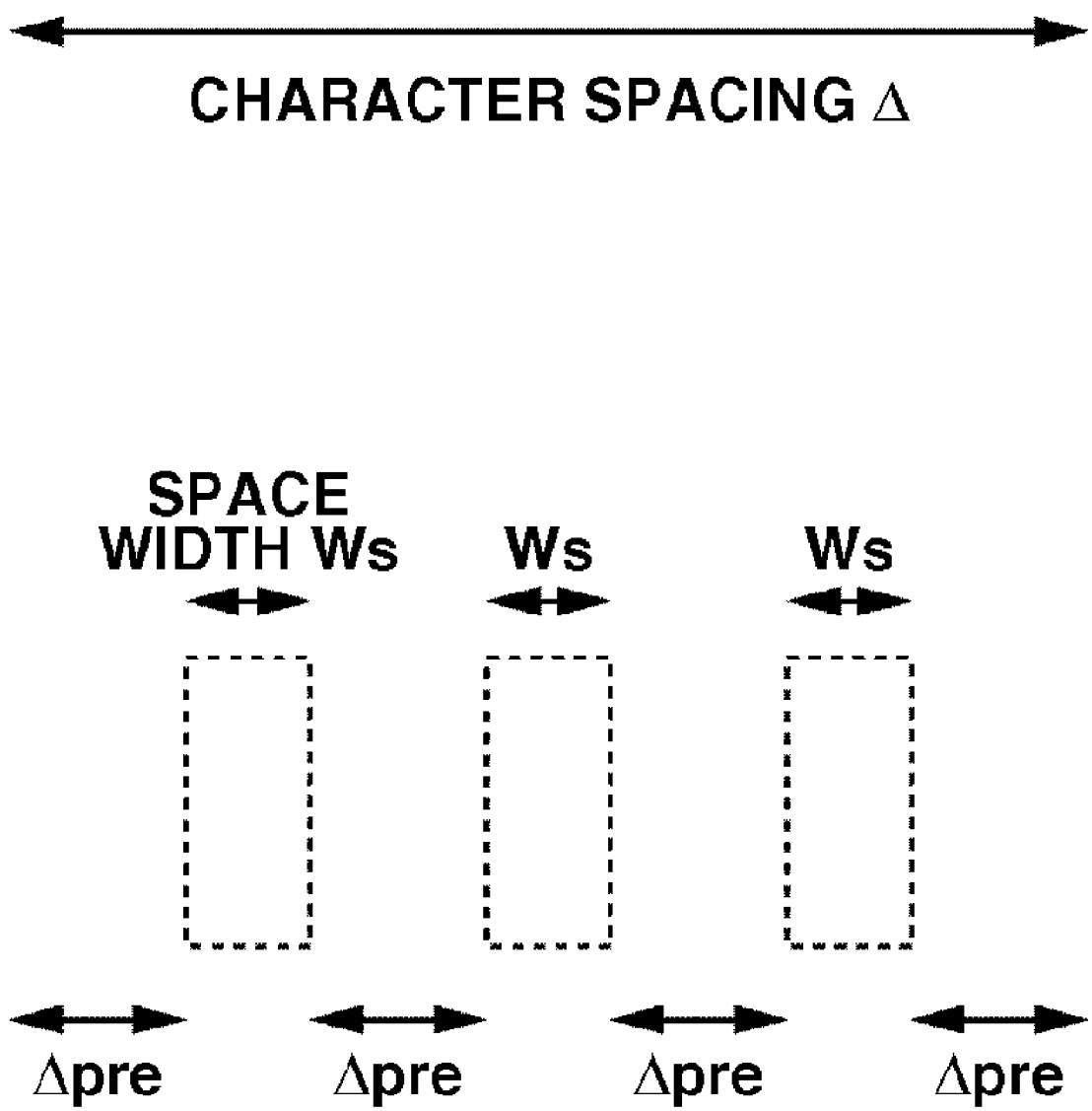
FIG. 16 illustrates an example of the determination as to plural spaces illustrated in FIG. 15 according to an exemplary embodiment of the present invention.

Referring to a flowchart illustrated in FIG. 15, a description is made of the determination as to plural spaces in steps S1303, S1310, and S1317 illustrated in FIG. 13 based on the example illustrated in FIG. 16.

In step S1501, the CPU 1 sets the number of spaces N as 2.

Next, in step S1502, the CPU 1 determines whether the following condition is satisfied.

$$Ws \times 0.8 \leq (\Delta - (N+1) \times \Delta\text{pre})/N \leq Ws \times 1.2.$$

FIG. 16 illustrates an example in which three spaces are inserted. As understood from the above description, a space width estimated based on character spacing is derived from $(\Delta - (N+1) \times \Delta\text{pre})/N$.

If the estimated space width is close to the actual space width, a corresponding number of spaces would be inserted.

If the condition is satisfied (YES in step S1502), the processing advances to step S1503, in which the CPU 1 increments N by 1 and returns to step S1502. In this case, the condition is satisfied with N=2. Thus, N=3.

The CPU 1 repeats the above processing. Then, if the condition is not satisfied in step S1502 finally, the processing advances to step S1504. In step S1504, the CPU 1 decrements N by 1. As a result, the largest possible value that meets the condition in step S1502 can be obtained as N.

Next, in step S1505, the CPU 1 determines whether the condition of N≧2 is satisfied.

If satisfied (YES in step S1505), then in step S1506, the CPU 1 determines that N spaces exist and inserts N spaces into the target inter-character space. Then, the CPU 1 terminates the determination as to plural spaces. If not satisfied (NO in step S1505), the processing advances to step S1507, in which the CPU 1 determines that no space exists and terminates the determination as to plural spaces.

As described above, after the completion of the space/tab determination processing in step S209, the processing then advances to step S210.

In this way, the CPU 1 executes determination as to a space or tab for the inter-character space in a document and inserts a corresponding space or tab to enable accurately performing character string search processing, such as an exact word-match search or a phrase search, without fail.

The above exemplary embodiment describes a PDF document as an example of the document that includes document layout information, but similar advantages can be attained with a PDL or HTML document.

The above exemplary embodiment describes the processing applicable to both of English (alphabetical) and Japanese fonts, but the present invention is not limited thereto. For example, the processing applicable to only an English (alphabetical) font can be performed.

In the case of configuring a document processing apparatus intended only for an English document, the CPU 1 can perform processing steps for the English document throughout the above flowcharts while skipping steps of determining whether a document is an English or Japanese one. In this case, the processing regarding the Japanese document can be skipped, and the respective flowcharts can be simplified.

Further, the present invention is applicable to a system or an integrated apparatus including a plurality of devices (for example, host computer, interface device, printer, or the like) or to an apparatus including a single device.

The present invention can be attained by supplying a storage medium (or recording medium) storing program code of software that realizes functions of the above-described exemplary embodiment to any system or device. In this case, the program code read from the storage medium realizes the functions of the exemplary embodiment, and the scope of the present invention encompasses the storage medium storing the program code. In addition, the scope of the present invention encompasses such an example where an operating system (OS) executes a part or the whole of the actual processing in response to an instruction of program code read by a computer to realize the functions of the above-described exemplary embodiment.

Moreover, the scope of the present invention encompasses such an example where program code read from a storage medium is written to a memory included in a function expansion card inserted into a computer or in a function expansion unit connected to a computer, and then a CPU provided in the function expansion unit or the function expansion unit executes a part or the whole of the actual processing in response to an instruction of the program code to realize the functions of the above-described exemplary embodiment.

If the present invention is applied to the above-described storage medium, the storage medium stores program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-336371 filed Dec. 13, 2006, which is hereby incorporated by reference herein in its entirety.

What is claimed is:

1. An apparatus comprising:
a character extraction unit configured to extract a character string from a document including layout information;
a heading determination unit configured to determine whether the extracted character string is a heading based on a heading tag, a character size and a line space between character strings;
a character width acquisition unit configured to acquire space character width information;
a spacing amount determination unit configured to determine a spacing amount of each inter-character space based on the character string extracted by the character extraction unit and the layout information; and
an insertion unit configured to determine whether a space character is to be included in each inter-character space based on the spacing amount of each inter-character space determined by the spacing amount determination unit and the space character width information acquired by the character width acquisition unit, and to insert a space character code into an inter-character space in which a space character is determined to be included,
wherein, when the heading determination unit determines that the extracted character string is the heading, the insertion unit is configured to correct the space character width information acquired by the character width acquisition unit, and to determine whether the space character is to be included in each inter-character space based on the spacing amount of each inter-character space and the corrected space character width information, and to insert the space character code into the inter-character space in which the space character is determined to be included.

2. The apparatus according to claim 1, wherein the insertion unit is configured to determine whether a space or a tab is to be included in each inter-character space based on the spacing amount of each inter-character space determined by the spacing amount determination unit and the space character width information acquired by the character width acquisition unit, and to insert a space character code or a tab code into an inter-character space in which a space character or a tab is determined to be included.

3. The apparatus according to claim 1, further comprising an equal-space determination unit configured to determine whether the extracted character string is equal-spaced,
wherein, when the equal-space determination unit determines that the extracted character string is equal-spaced, the insertion unit is configured to correct the space character width information acquired by the character width acquisition unit, and to determine whether the space character is to be included in each inter-character space based on the spacing amount of each inter-character space and the corrected space character width information, and to insert the space character code into the inter-character space in which the space character is determined to be included.

4. The apparatus according to claim 1, wherein the insertion unit is configured to change a condition for determining whether to insert the space character code based on whether a character previous to each inter-character space is an alphabetical character or a Japanese character.

5. The apparatus according to claim 1, further comprising a search unit configured to perform at least one of an exact word-match search and a phrase search on a character string into which the space character code is inserted.

6. The apparatus according to claim 1, wherein the character width acquisition unit is configured to acquire space character width information based on space character width information of a font included in the document, character width information of a space character of a font stored in the apparatus, or character width information of a space character of a font stored in an external device.

7. The apparatus according to claim 1, wherein if no character width information of the space character is acquired from a font, the character width acquisition unit acquires space character width information based on a character width of a previous character.

8. A method comprising:
extracting a character string from a document including layout information;
determining whether the extracted character string is a heading based on a heading tag, a character size and a line space between character strings;

acquiring space character width information;

determining a spacing amount of each inter-character space based on the extracted character string and the layout information;

determining whether a space character is to be included in each inter-character space based on the determined spacing amount of each inter-character space and the acquired space character width information; and inserting a space character code into an inter-character space in which a space character is determined to be included, wherein, when the extracted character string is determined to be the heading, the acquired space character width information is corrected in the inserting step, and it is determined in the inserting step whether the space character is to be included in each inter-character space based on the spacing amount of each inter-character space and the corrected space character width information, and the space character code is inserted into the inter-character space in which the space character is determined to be included.

9. The method according to claim 8, wherein the space character width information is acquired based on a font type and a font size of the character string extracted from the document.

10. The method according to claim 8, wherein the document is in Portable Document Format (PDF) or Page Description Language (PDL).

11. The method according to claim 8, wherein the layout information includes position information associated with each character of the character string extracted from the document.

12. A non-transitory computer-readable storage medium storing instructions which, when executed by an apparatus, cause the apparatus to perform operations comprising:

extracting a character string from a document including layout information;

determining whether the extracted character string is a heading based on a heading tag, a character size and a line space between character strings;

acquiring space character width information;

determining a spacing amount of each inter-character space based on the extracted character string and the layout information;

determining whether a space character is to be included in each inter-character space based on the determined spacing amount of each inter-character space and the acquired space character width information; an inserting a space character code into an inter-character space in which a space character is determined to be included, wherein, when the extracted character string is determined to be the heading, the acquired space character width information is corrected in the inserting step, and it is determined in the inserting step whether the space character is to be included in each inter-character space based on the spacing amount of each inter-character space and the corrected space character width information, and the space character code is inserted into the inter-character space in which the space character is determined to be included.

* * * * *